United States Patent
Boualleg et al.

(10) Patent No.: US 10,125,327 B2
(45) Date of Patent: Nov. 13, 2018

(54) MESOPOROUS AND MACROPOROUS CATALYST FOR HYDROCONVERSION OF RESIDUES AND PREPARATION METHOD

(71) Applicant: IFP Energies nouvelles, Rueil-Malmaison (FR)

(72) Inventors: Malika Boualleg, Villeurbanne (FR); Bertrand Guichard, Izeaux (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 52 days.

(21) Appl. No.: 15/318,151

(22) PCT Filed: Jun. 9, 2015

(86) PCT No.: PCT/EP2015/062820
§ 371 (c)(1),
(2) Date: Dec. 12, 2016

(87) PCT Pub. No.: WO2015/189194
PCT Pub. Date: Dec. 17, 2015

(65) Prior Publication Data
US 2017/0121612 A1   May 4, 2017

(30) Foreign Application Priority Data
Jun. 13, 2014  (FR) ..................... 14 55417

(51) Int. Cl.
*C10G 45/00* (2006.01)
*C10G 45/08* (2006.01)
(Continued)

(52) U.S. Cl.
CPC .............. *C10G 45/08* (2013.01); *B01J 21/04* (2013.01); *B01J 23/002* (2013.01); *B01J 27/188* (2013.01);
(Continued)

(58) Field of Classification Search
CPC .. C10G 45/08; C10G 65/04; C10G 2300/202; C10G 2300/205; B01J 37/08;
(Continued)

(56) References Cited

U.S. PATENT DOCUMENTS 5,478,791 A   12/1995  Baldauf et al.
5,620,592 A   4/1997   Threlkel
(Continued)

FOREIGN PATENT DOCUMENTS

EP   2255873 A2    12/2010
WO   2005/028106 A1  3/2005
(Continued)

OTHER PUBLICATIONS

International Search Report dated Sep. 9, 2015 issued in corresponding PCT/EP2015/062820, 4 pages.
(Continued)

*Primary Examiner* — Randy Boyer
*Assistant Examiner* — Juan C Valencia
(74) *Attorney, Agent, or Firm* — Millen White Zelano and Branigan, PC; John Sopp

(57) ABSTRACT

Process of preparing hydroconversion catalyst comprising:
  a calcined, predominantly alumina, oxide support;
  a hydrogenating-dehydrogenating active phase comprising group VIB metal, the catalyst having:
  specific surface area ≥100 m$^2$/g,
  total pore volume ≥0.75 ml/g,
  median mesopore diameter by volume ≥18 nm,
  mesopore volume ≥0.65 ml/g,
  macropore volume 15-40% of total pore volume;
comprising:
  a) dissolving acidic aluminum precursor;
  b) adjusting pH with basic precursor;
  c) co-precipitating acidic and basic precursors, at least one containing aluminum, to form suspension of alumina gel with a targeted alumina concentration;
(Continued)

d) filtration;
e) drying to a powder;
f) forming;
g) thermal treatment to an alumina oxide support;
h) impregnating of the hydrogenating-dehydrogenating active phase on the alumina oxide support. Catalyst prepared by this process and use thereof for hydrotreating or hydroconverting heavy hydrocarbon feedstocks.

21 Claims, 3 Drawing Sheets

(51) Int. Cl.
| | |
|---|---|
| B01J 37/03 | (2006.01) |
| B01J 37/20 | (2006.01) |
| B01J 21/04 | (2006.01) |
| B01J 23/00 | (2006.01) |
| B01J 27/188 | (2006.01) |
| B01J 27/19 | (2006.01) |
| B01J 35/10 | (2006.01) |
| B01J 37/02 | (2006.01) |
| B01J 37/00 | (2006.01) |
| B01J 37/08 | (2006.01) |
| C10G 65/04 | (2006.01) |

(52) U.S. Cl.
CPC ............ *B01J 27/19* (2013.01); *B01J 35/109* (2013.01); *B01J 35/1014* (2013.01); *B01J 35/1019* (2013.01); *B01J 35/1023* (2013.01); *B01J 35/1028* (2013.01); *B01J 35/1042* (2013.01); *B01J 35/1047* (2013.01); *B01J 35/1061* (2013.01); *B01J 35/1066* (2013.01); *B01J 37/009* (2013.01); *B01J 37/0201* (2013.01); *B01J 37/0207* (2013.01); *B01J 37/0236* (2013.01); *B01J 37/031* (2013.01); *B01J 37/036* (2013.01); *B01J 37/08* (2013.01); *B01J 37/20* (2013.01); *C10G 65/04* (2013.01); *B01J 2523/00* (2013.01); *C10G 2300/202* (2013.01); *C10G 2300/205* (2013.01)

(58) Field of Classification Search
CPC .. B01J 35/1023; B01J 37/009; B01J 37/0207; B01J 37/031; B01J 35/1028; B01J 37/0236; B01J 23/002; B01J 37/20; B01J 27/19; B01J 35/1042; B01J 37/0201; B01J 37/036; B01J 35/1014; B01J 21/04; B01J 27/188; B01J 35/1066; B01J 35/1061; B01J 35/1019; B01J 35/109; B01J 35/1047; B01J 2523/00
See application file for complete search history.

(56) References Cited

U.S. PATENT DOCUMENTS

| | | |
|---|---|---|
| 6,589,908 B1 | 7/2003 | Ginestra et al. |
| 2005/0101480 A1 | 5/2005 | Ackerman et al. |
| 2010/0155301 A1 | 6/2010 | Guichard et al. |
| 2014/0174983 A1 | 6/2014 | Klien et al. |

FOREIGN PATENT DOCUMENTS

| | | | |
|---|---|---|---|
| WO | WO 2005/028106 | * | 3/2005 |
| WO | 2013/032628 A1 | | 3/2013 |

OTHER PUBLICATIONS

English translation Abstract of EP2255873A2 published Dec. 1, 2010 (1 page).

* cited by examiner

MESOPOROUS AND MACROPOROUS CATALYST FOR HYDROCONVERSION OF RESIDUES AND PREPARATION METHOD

TECHNOLOGICAL FIELD OF THE INVENTION

The invention relates to hydrotreating catalysts having a texture and a formulation that are favourable to hydrodemetallization (HDM), while preserving satisfactory activity in hydrodesulphurization (HDS), the preparation thereof and the use thereof. The invention consists of using mesoporous and macroporous catalysts supported on an alumina oxide matrix comprising group VIB and group VIII elements, as well as the element phosphorus. It was discovered that this type of formulation combined with a support with specific textural properties makes it possible, in particular in the first catalyst beds of a fixed-bed process for the hydrotreating of residues, but also in an ebullating-bed process, to improve significantly the activity in hydrodemetallization (HDM) and the stability over time.

PRIOR ART

It is known to a person skilled in the art that catalytic hydrotreating makes it possible, by bringing a hydrocarbon feedstock into contact with a catalyst whose properties, in terms of metals of the active phase and of porosity, are well adjusted beforehand, to reduce its content of asphaltenes, metals, sulphur and other impurities considerably, while improving the ratio of hydrogen to carbon (H/C) and while transforming it more or less partially to lighter cuts.

The fixed-bed processes for hydrotreating residues (commonly called "Resid Desulphurization" unit or RDS) lead to high refining performances: typically they make it possible to produce a cut with a boiling point greater than 370° C. containing less than 0.5% by weight of sulphur and less than 20 ppm of metals from feedstocks containing up to 5% by weight of sulphur and up to 250 ppm of metals (Ni+V). The different effluents thus obtained may serve as a base for producing heavy fuel oils of good quality and/or of pretreated feedstocks for other units such as catalytic cracking ("Fluid Catalytic Cracking"). On the other hand, the hydroconversion of the residue to cuts lighter than atmospheric residue (in particular gas oil and gasoline) is generally low, typically of the order of 10 to 20% by weight. In such a process, the feedstock, mixed with hydrogen beforehand, circulates through several fixed-bed reactors arranged in series and filled with catalysts. The total pressure is typically comprised between 100 and 200 bar (10-20 MPa) and the temperatures are between 340 and 420° C. The effluents withdrawn from the last reactor are sent to a fractionating section.

Conventionally, the fixed-bed hydrotreating process consists of at least two stages (or sections). The first stage called hydrodemetallization (HDM) mainly aims to remove most of the metals from the feedstock using one or more hydrodemetallization catalysts. This stage mainly combines the operations of removal of vanadium and nickel and to a lesser extent of iron.

The second stage or section, called hydrodesulphurization (HDS), consists of passing the product from the first stage over one or more hydrodesulphurization catalysts that are more active in terms of hydrodesulphurization and hydrogenation of the feedstock, but are less tolerant of metals.

For the hydrodemetallization stage (HDM), the catalyst must be suitable for treating feedstocks with high contents of metals and asphaltenes, while having a high demetallizing power combined with a high capacity for retention of metals and high resistance to coking. Catalysts with a bimodal pore distribution allowing high yields to be attained in hydrodemetallization were described in patent U.S. Pat. No. 5,221,656. The benefit of such a pore distribution is also highlighted in patents U.S. Pat. Nos. 5,089,463 and 7,119,045. The initial active phase of the catalyst used in the hydrodemetallization stage generally consists of nickel and molybdenum, and optionally dopants such as phosphorus. This active phase is known to be more hydrogenating than a phase consisting of cobalt and molybdenum, which is also used sometimes, and therefore makes it possible to limit coke formation in the pores and thus deactivation.

For the hydrodesulphurization stage (HDS), the catalyst must have a strong hydrogenolysis potential so as to carry out deep refining of the products: desulphurization, continuation of demetallization, lowering of the Conradson carbon content (Conradson Carbon Residue: CCR) and of the asphaltenes content. Such a catalyst is characterized by a low macropore volume (U.S. Pat. No. 6,589,908). Moreover, patent U.S. Pat. No. 4,818,743 teaches that the pore distribution may be monopopulated between 1 and 13 nm or bipopulated with a relative difference between the two populations which may vary from 1 to 20 nm, as in patent U.S. Pat. No. 6,589,908. The active phase of the catalyst used in the hydrodesulphurization stage generally consists of cobalt and molybdenum, as is described in patent U.S. Pat. No. 6,332,976.

When the content of metals in the feedstock is too high (above 250 ppm) and/or when greater conversion (transformation of the heavy fraction 540° C.+ (or 370° C.+) to a lighter fraction 540° C.− (or 370° C.−)) is required, ebullating-bed hydrotreating processes are preferred. In this type of process (cf. M. S. Rana et al., Fuel 86 (2007), p 1216), the purification performances are lower than in the RDS processes, but hydroconversion of the residue fraction is high (of the order of 45 to 85% by volume). The high temperatures used, comprised between 415 and 440° C., contribute to this increased hydroconversion. The reactions of thermal cracking are in fact promoted, as the catalyst does not generally have a specific hydroconversion function. Moreover, the effluents formed by this type of conversion may present problems of stability (formation of sediments).

For the hydrotreating of residues, it is therefore essential to develop stable, high-performance multipurpose catalysts.

For ebullating-bed processes, patent application WO 2010/002699 teaches in particular that it is advantageous to use a catalyst the support of which has a median pore diameter comprised between 10 and 14 nm with a narrow distribution. It is stated there that less than 5% of the pore volume must be developed in the pores larger than 21 nm and, similarly, less than 10% of the volume must be observed in the small pores, smaller than 9 nm. Patent U.S. Pat. No. 5,968,348 confirms the preference for use of a support the mesoporosity of which remains close to 11 to 13 nm, optionally with the presence of macropores and a high BET surface area, here at least 175 m$^2$/g.

For fixed-bed processes, patent U.S. Pat. No. 6,780,817 teaches that it is necessary to use a catalyst support that has at least 0.32 ml/g of macropore volume for stable fixed-bed operation. Moreover, such a catalyst has a median diameter, in the mesopores, from 8 to 13 nm and a high specific surface area of at least 180 m$^2$/g.

Patent U.S. Pat. No. 6,919,294 also describes the use of so-called bimodal supports, i.e. mesoporous and macroporous, using large macropore volumes, but with a mesopore volume limited to 0.4 ml/g at most.

Patents U.S. Pat. Nos. 4,976,848 and 5,089,463 describe a catalyst for hydrodemetallization and hydrodesulphurization of heavy feedstocks comprising a hydrogenating active phase based on metals of groups VI and VIII and a refractory oxide inorganic support, the catalyst having precisely between 5 and 11% of its pore volume in the form of macropores and having mesopores of median diameter greater than 16.5 nm.

U.S. Pat. No. 7,169,294 describes a catalyst for hydroconversion of heavy feedstocks, comprising between 7 and 20% of group VI metal and between 0.5 and 6% by weight of group VIII metal, on an alumina support. The catalyst has a specific surface area comprised between 100 and 180 m$^2$/g, a total pore volume greater than or equal to 0.55 ml/g, at least 50% of the total pore volume is comprised in the pores larger than 20 nm, at least 5% of the total pore volume is comprised in the pores larger than 100 nm, at least 85% of the total pore volume being comprised in the pores with a size comprised between 10 and 120 nm, less than 2% of the total pore volume being contained in the pores with a diameter greater than 400 nm, and less than 1% of the total pore volume being contained in the pores with a diameter greater than 1000 nm.

Numerous developments relate in particular to optimization of the pore distribution of the catalyst or of mixtures of catalysts by optimizing the catalyst support.

Thus, patent U.S. Pat. No. 6,589,908 describes for example a preparation process for an alumina that is characterized by absence of macropores, less than 5% of the total pore volume consisting of pores with a diameter greater than 35 nm, a high pore volume greater than 0.8 ml/g, and a bimodal distribution of mesopores in which the two modes are 1 to 20 nm apart and the primary pore mode is greater than the median pore diameter. For this purpose, the manner of preparation described uses two stages of precipitation of alumina precursors under well-controlled conditions of temperature, pH and flow rates. The first stage operates at a temperature comprised between 25 and 60° C., and pH comprised between 3 and 10. The suspension is then heated to a temperature comprised between 50 and 90° C. Reagents are added to the suspension again, and it is then washed, dried, formed and calcined to form a catalyst support. Said support is then impregnated with a solution of active phase in order to obtain a hydrotreating catalyst; a catalyst for hydrotreating residues on a mesoporous monomodal support with median pore diameter of approximately 20 nm is described.

Patent application WO 2004/052534 A1 describes the use, in the hydrotreating of heavy hydrocarbon feedstocks, of a mixture of two catalysts with supports having different porosity characteristics, the first catalyst having more than half of the pore volume in the pores with a diameter greater than 20 nm, 10 to 30% of the pore volume being contained in the pores with a diameter greater than 200 nm, the total pore volume being greater than 0.55 ml/g, the second having more than 75% of the pore volume contained in the pores with a diameter comprised between 10 and 120 nm, less than 2% in the pores with a diameter greater than 400 nm and 0 to 1% in the pores with a diameter greater than 1000 nm. The preparation process described for preparing these catalysts uses a stage of co-precipitation of aluminium sulphate with sodium aluminate; the gel obtained is then dried, extruded and calcined. It is possible to add silica during or after co-precipitation. Adjustment of forming makes it possible to obtain the characteristics of the support.

Metals of groups VIB, VII, IA or V may be incorporated in the support, by impregnation and/or by incorporation in the support before it is formed into particles. Impregnation is preferred.

U.S. Pat. No. 7,790,652 describes hydroconversion catalysts which can be obtained by coprecipitation of an alumina gel, and then introduction of metals on the support obtained by any method known to a person skilled in the art, in particular by impregnation. The catalyst obtained has a monomodal distribution with a median mesopore diameter comprised between 11 and 12.6 nm and a pore distribution width of less than 3.3 nm.

Alternative approaches to the conventional introduction of metals on alumina supports have also been developed, such as incorporation of catalyst fines in the support. Thus, patent application WO2012/021386 describes hydrotreating catalysts comprising a support of the refractory porous oxide type formed from alumina powder and 5 to 45% by weight of catalyst fines. The support comprising the fines is then dried and calcined. The support obtained has a specific surface area comprised between 50 m$^2$/g and 450 m$^2$/g, an average pore diameter comprised between 50 and 200 Å, and a total pore volume exceeding 0.55 cm$^3$/g. The support thus comprises incorporated metal owing to the metals contained in the catalyst fines. The resultant support can be treated using a chelating agent. The pore volume may be partially filled by means of a polar additive, and may then be impregnated with a metallic impregnation solution.

Judging from the prior art, it seems very difficult to obtain a hydroconversion catalyst having both a bimodal porosity, with a high mesopore volume coupled to a consistent macropore volume, a very large median diameter of the mesopores, and an impregnated hydrogenating-dehydrogenating active phase. Moreover, the increase in porosity is often at the expense of the specific surface area, and mechanical strength.

Surprisingly, the applicant discovered that a catalyst prepared from an alumina resulting from the calcination of a specific alumina gel having a targeted alumina content, by impregnation of a hydrogenating-dehydrogenating active phase on a support comprising predominantly calcined alumina, had a particularly interesting porous structure with a content of active phase suitable for hydrotreating heavy feedstocks, in particular for the reactions of hydrodemetallization.

SUBJECTS OF THE INVENTION

The present invention relates to the preparation of a catalyst comprising at least one group VIB element, optionally at least one group VIII element and optionally the element phosphorus supported on an alumina oxide support having particular textural properties, said support in particular having a high total pore volume (greater than or equal to 0.80 ml/g), a large median diameter of the mesopores (greater than or equal to 18 nm), a mesopore volume of at least 0.70 ml/g, a macropore volume comprised between 10 and 35% of the total pore volume, a median macropore diameter comprised between 100 and 1200 nm, while its BET specific surface area remains greater than 110 m$^2$/g, said process comprising at least the following stages:

a) Dissolution of an acidic aluminium precursor;
b) Adjustment of the pH by means of a basic precursor;
c) Co-precipitation of an acidic precursor and a basic precursor, at least one of the two containing aluminium, to form a suspension of alumina gel with a targeted alumina concentration;

d) Filtration;
e) Drying to obtain a powder;
f) Forming;
g) Thermal treatment to obtain an alumina oxide support;
h) Impregnation of the hydrogenating-dehydrogenating active phase on said alumina oxide support.

The invention also relates to the catalyst that can be prepared by the preparation process described.

The invention finally relates to the use of this catalyst in processes for the hydrotreatment or hydroconversion of heavy hydrocarbon feedstocks, in particular of feedstocks with high concentrations of metals (for example nickel and vanadium, with concentrations exceeding 50 ppm).

DESCRIPTION OF THE INVENTION

SUMMARY

The invention relates to a preparation process for a hydroconversion catalyst comprising:
a calcined, predominantly alumina, oxide support;
a hydrogenating-dehydrogenating active phase comprising at least one metal of group VIB of the periodic table, optionally at least one metal of group VIII of the periodic table, optionally phosphorus,
said catalyst having:
a specific surface area Sbet greater than or equal to 100 m²/g,
a total pore volume measured by mercury porosimetry greater than or equal to 0.75 ml/g,
a median mesopore diameter by volume greater than or equal to 18 nm,
a mesopore volume as measured with a mercury intrusion porosimeter greater than or equal to 0.65 ml/g,
a macropore volume comprised between 15 and 40% of the total pore volume; said process comprising at least the following stages:
a) A stage of dissolution of an acidic aluminium precursor selected from aluminium sulphate, aluminium chloride and aluminium nitrate in water, at a temperature comprised between 20 and 90° C., at a pH comprised between 0.5 and 5, for a duration comprised between 2 and 60 minutes;
b) A stage of pH adjustment by adding, to the suspension obtained in stage a), at least one basic precursor selected from sodium aluminate, potassium aluminate, ammonia, sodium hydroxide and potassium hydroxide, at a temperature comprised between 20 and 90° C., and at a pH comprised between 7 and 10, for a duration comprised between 5 and 30 minutes;
c) A stage of co-precipitation of the suspension obtained at the end of stage b) by adding, to the suspension, at least one basic precursor selected from sodium aluminate, potassium aluminate, ammonia, sodium hydroxide and potassium hydroxide and at least one acidic precursor selected from aluminium sulphate, aluminium chloride, aluminium nitrate, sulphuric acid, hydrochloric acid and nitric acid, at least one of the basic or acidic precursors comprising aluminium, the relative flow rate of the acidic and basic precursors being selected so as to obtain a pH of the reaction medium comprised between 7 and 10 and the flow rate of the acidic and basic precursor or precursors containing aluminium being controlled so as to obtain a final alumina concentration in the suspension comprised between 10 and 38 g/L;

d) a stage of filtration of the suspension obtained at the end of the co-precipitation stage c) in order to obtain an alumina gel;
e) a stage of drying said alumina gel obtained in stage d) in order to obtain a powder,
f) a stage of forming the powder obtained at the end of stage e) in order to obtain a crude material,
g) a stage of thermal treatment of the crude material obtained at the end of stage f) at a temperature comprised between 500 and 1000° C., in the presence or absence of an air flow containing up to 60% by volume of water, in order to obtain an alumina oxide support;
h) a stage of impregnation of the hydrogenating-dehydrogenating active phase on said alumina oxide support.

The alumina concentration of the suspension of alumina gel obtained in stage c) is preferably comprised between 13 and 35 g/l, very preferably between 15 and 33 g/l.

Preferably, the acidic precursor is aluminium sulphate.

Preferably, the basic precursor is sodium aluminate.

Preferably, in stages a), b), c) the aqueous reaction medium is water and said stages are carried out with stirring, in the absence of organic additive.

Preferably, the acidic precursor of stage a) is introduced in a quantity corresponding to 0.5 to 4% by weight of the total alumina formed at the end of stage c).

The invention also relates to a mesoporous and macroporous hydroconversion catalyst that can be prepared by the above process.

In a preferred embodiment, the catalyst has:
a specific surface area Sbet greater than 110 m²/g,
a median mesopore diameter by volume comprised between 18 nm and 26 nm,
a median macropore diameter by volume comprised between 100 and 1200 nm inclusive
a mesopore volume as measured with a mercury intrusion porosimeter greater than or equal to 0.70 ml/g
a total pore volume measured by mercury porosimetry greater than or equal to 0.85 ml/g,
a macropore volume comprised between 17 and 35% of the total pore volume
an absence of micropores.

Preferably, the catalyst has a macropore volume comprised between 20 and 30% of the total pore volume.

Preferably, the catalyst has a median mesopore diameter by volume determined with a mercury intrusion porosimeter comprised between 19 and 25 nm and a median macropore diameter by volume comprised between 110 and 1000 nm inclusive.

In the hydroconversion catalyst according to the invention, the content of group VIB metal is advantageously comprised between 2 and 10% by weight of trioxide of group VIB metal relative to the total weight of the catalyst, the content of group VIII metal is advantageously comprised between 0.00 and 3.6% by weight of the oxide of group VIII metal relative to the total weight of the catalyst, and the content of the element phosphorus is advantageously comprised between 0 and 5% by weight of phosphorus pentoxide relative to the total weight of the catalyst.

Preferably, the hydrogenating-dehydrogenating active phase is composed of molybdenum or nickel and of molybdenum or of cobalt and molybdenum.

Advantageously, the hydrogenating-dehydrogenating active phase also comprises phosphorus.

The invention also relates to a process for hydrotreating a heavy hydrocarbon feedstock selected from atmospheric residues, vacuum residues obtained from direct distillation, deasphalted oils, residues originating from conversion processes such as for example those originating from coking, from fixed-bed, ebullating-bed or moving-bed hydroconversion, used alone or in a mixture, comprising bringing said feedstock into contact with a hydroconversion catalyst according to the invention or prepared by the preparation process according to the invention.

Said hydrotreating process may be carried out partly in an ebullating bed at a temperature comprised between 320 and 450° C., under a hydrogen partial pressure comprised between 3 MPa and 30 MPa, at a space velocity advantageously comprised between 0.1 and 10 volumes of feedstock per volume of catalyst per hour, and with a ratio of gaseous hydrogen to liquid hydrocarbon feedstock advantageously comprised between 100 and 3000 normal cubic metres per cubic metre.

Said hydrotreating process may be carried out at least partly in a fixed bed at a temperature comprised between 320° C. and 450° C., under a hydrogen partial pressure comprised between 3 MPa and 30 MPa, at a space velocity comprised between 0.05 and 5 volumes of feedstock per volume of catalyst per hour, and with a ratio of gaseous hydrogen to liquid hydrocarbon feedstock comprised between 200 and 5000 normal cubic metres per cubic metre.

Said process may be a fixed-bed process for hydrotreating a heavy hydrocarbon feedstock of the residue type comprising at least:
a hydrodemetallization stage;
a hydrodesulphurization stage;
in which said hydroconversion catalyst is used in at least one of said stages a) and b).

In a preferred embodiment, said hydroconversion catalyst is used in the first catalyst beds of the hydrodemetallization stage a).

Said process may be an ebullating-bed process for hydrotreating a heavy hydrocarbon feedstock, in which the feedstock has a cumulative metals content greater than or equal to 50 ppm and said hydroconversion catalyst is used for the reactions of hydrodemetallization.

BRIEF DESCRIPTION OF DRAWINGS

The figures are presented for purposes of illustration and relate to the examples.

TERMINOLOGY AND TECHNIQUES FOR CHARACTERIZATION

Figure 1:
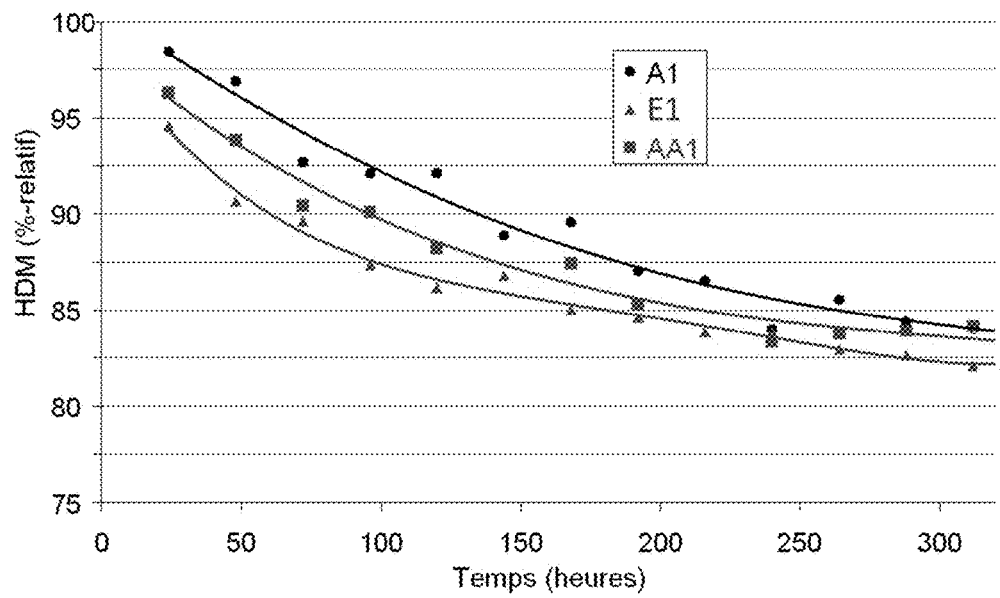
FIG. 1 shows the evolution to 300 hours of the relative hydrodemetallization HDM performances of catalysts A1, AA1, and E1 on a feedstock No. 1 comprising a mixture of atmospheric residue and vacuum residue (ARAM/VRAL).

The catalyst and the support of the present invention have a specific pore distribution, where the macropore and mesopore volumes are measured by mercury intrusion and the micropore volume is measured by nitrogen adsorption.

By "macropores" is meant pores the opening of which is greater than 50 nm.

By "mesopores" is meant pores the opening of which is comprised between 2 nm and 50 nm inclusive.

By "micropores" is meant pores the opening of which is less than 2 nm.

In the following disclosure of the invention, by specific surface area is meant the BET specific surface area determined by nitrogen adsorption according to standard ASTM D 3663-78 based on the BRUNAUER-EMMETT-TELLER method described in the periodical "The Journal of the American Chemical Society", 60, 309, (1938).

In the following disclosure of the invention, by total pore volume of the alumina or of the support or of the catalyst is meant the volume measured with a mercury intrusion porosimeter according to standard ASTM D4284-83 at a maximum pressure of 4000 bar (400 MPa), using a surface tension of 484 dyne/cm and a contact angle of 140°. The wetting angle was taken equal to 140° following the recommendations in the work "Techniques de l'ingénieur, traité analyse et caractérisation" (Techniques of the engineer, a treatise on analysis and characterization), p.1050-5, written by Jean Charpin and Bernard Rasneur.

In order to obtain greater accuracy, the value of the total pore volume in ml/g given in the following text corresponds to the value of the total mercury volume (total pore volume measured with a mercury intrusion porosimeter) in ml/g measured on the sample minus the value of the mercury volume in ml/g measured on the same sample for a pressure corresponding to 30 psi (approximately 0.2 MPa).

The volume of the macropores and mesopores is measured by mercury intrusion porosimetry according to standard ASTM D4284-83 at a maximum pressure of 4000 bar (400 MPa), using a surface tension of 484 dyne/cm and a contact angle of 140°.

The value starting from which the mercury fills all the intergranular voids is fixed at 0.2 MPa, and it is considered that beyond this, the mercury penetrates into the pores of the sample.

The macropore volume of the catalyst or of the support is defined as the cumulative volume of mercury introduced at a pressure comprised between 0.2 MPa and 30 MPa, corresponding to the volume contained in the pores with an apparent diameter greater than 50 nm.

The mesopore volume of the catalyst or of the support is defined as the cumulative volume of mercury introduced at a pressure comprised between 30 MPa and 400 MPa, corresponding to the volume contained in the pores with an apparent diameter comprised between 2 and 50 nm.

The volume of the micropores is measured by nitrogen porosimetry. Quantitative analysis of the microporosity is carried out on the basis of the "t" method (method of Lippens-De Boer, 1965), which corresponds to a transform of the initial adsorption isotherm as described in the work "Adsorption by powders and porous solids. Principles, methodology and applications" written by F. Rouquérol, J. Rouquérol and K. Sing, Academic Press, 1999.

The median mesopore diameter is also defined as a diameter such that all the pores smaller than this diameter constitute 50% of the total mesopore volume determined with a mercury intrusion porosimeter.

The median macropore diameter is also defined as a diameter such that all the pores smaller than this diameter constitute 50% of the total macropore volume determined with a mercury intrusion porosimeter.

Hereinafter, the groups of chemical elements are given according to the CAS classification (CRC Handbook of Chemistry and Physics, publisher CRC Press, editor in chief D. R. Lide, 81st edition, 2000-2001). For example, group VIII according to the CAS classification corresponds to the metals of columns 8, 9 and 10 according to the new IUPAC classification.

DETAILED DESCRIPTION OF THE INVENTION

The applicant discovered that the combination of at least one group VIB element, optionally at least one group VIII element and optionally the element phosphorus with an alumina oxide that has simultaneously a large pore volume (>0.80 ml/g), a high median diameter of the mesopores (greater than or equal to 18 nm), and thus a BET surface area greater than 110 m²/g, leads to a catalyst with particular textural properties that gives a significant gain in hydrodemetallization in a fixed-bed process or in an ebullating-bed process treating heavy hydrocarbon feedstocks, in particular feedstocks with a cumulative metals content of more than 50 ppm. The amorphous mesoporous alumina support results from the forming of an alumina gel having a controlled alumina content, said alumina gel being obtained by precipitation of at least one aluminium salt.

Introduction of this catalyst into the first catalyst beds of a fixed-bed process or into an ebullating-bed process treating feedstocks with a high concentration of metals gives a significant gain in hydrodemetallization, and therefore requires a lower operating temperature than the catalysts of the prior art to attain the same level of conversion of the metallated compounds. A large gain in stability over time is also observed.

General Description of the Catalyst

The catalyst that can be prepared according to the invention is in the form of a calcined, predominantly alumina, oxide support on which the metals of the active phase are distributed. The support meets specific characteristics that are described below, as do the active phase and the formulation thereof, though to a lesser extent. The preparation thereof, as well as the use of the catalyst in processes for hydrotreating heavy hydrocarbon feedstocks according to the invention, are also described below.

The group VIB metals are advantageously selected from molybdenum and tungsten, and preferably said group VIB metal is molybdenum.

The group VIII metals are advantageously selected from iron, nickel or cobalt, and nickel or cobalt, or a combination of the two, will be preferred.

The respective quantities of group VIB metal and of group VIII metal are advantageously such that the atomic ratio of group VIII metal(s) to group VIB metal(s) (VIII:VIB) is comprised between 0.0:1.0 and 0.7:1.0, preferably 0.05:1.0 and 0.7:1.0, very preferably between 0.1:1.0 and 0.6:1.0 and even more preferably between 0.2:1.0 and 0.5:1.0. This ratio may in particular be adjusted depending on the type of feedstock and the process used.

The respective quantities of group VIB metal and of phosphorus are such that the atomic ratio of phosphorus to group VIB metal(s) (P/VIB) is comprised between 0.0:1.0 and 1.0:1.0, preferably between 0.4:1.0 and 0.9:1.0 and even more preferably between 0.5:1.0 and 0.85:1.0.

The content of group VIB metal is advantageously comprised between 2 and 10% by weight of trioxide of at least the group VIB metal relative to the total weight of the catalyst, preferably between 3 and 8% and even more preferably between 4 and 7% by weight.

The content of group VIII metal is advantageously comprised between 0.0 and 3.6%, in particular between 0.25 and 3.6% by weight, preferably between 0.4 and 2.5% by weight of the oxide of at least the group VIII metal relative to the total weight of the catalyst, very preferably between 0.6 and 3.7% by weight, and even more preferably between 1.2 and 2.8% by weight.

The content of the element phosphorus is advantageously comprised between 0 and 5% by weight, preferably between 0.2 and 5.0% by weight of phosphorus pentoxide relative to the total weight of the catalyst, very preferably between 0.6 and 3.5% by weight and even more preferably between 1.0 and 3.0% by weight.

Said catalyst based on the porous alumina oxide according to the invention is generally used in all the forms known to a person skilled in the art. Preferably, it consists of extrudates with a diameter generally comprised between 0.5 and 10 mm, preferably between 0.8 and 3.2 mm and very preferably between 1.0 and 2.5 mm. The latter may advantageously be in the form of cylindrical, trilobed or tetralobed extrudates. They are preferably of multilobed, trilobed or tetralobed shape. The shape of the lobes may be adjusted by any methods known from the prior art.

Characteristics of the Support According to the Invention

The support of the catalyst according to the invention comprises predominantly a porous alumina oxide. Preferably the support consists exclusively of alumina.

The support of said catalyst according to the invention generally comprises an alumina content greater than or equal to 90% and a silica content in $SiO_2$ equivalent of at most 10% by weight relative to the final oxide, preferably a silica content below 5% by weight, very preferably a content below 2% by weight.

The silica may be introduced by any technique known to a person skilled in the art, for example during synthesis of the alumina gel or during the co-mixing stage.

The support used for preparing the catalyst according to the invention advantageously has a total pore volume (TPV) of at least 0.80 ml/g, preferably at least 0.90 ml/g, and very preferably at least 0.95 ml/g.

The support used according to the invention advantageously has a macropore volume, $V_{50\ nm}$, defined as the volume of the pores with a diameter greater than 50 nm, comprised between 10 and 35% of the total pore volume, preferably between 15 and 30% of the total pore volume, and very preferably between 20 and 30% of the total pore volume.

The support used according to the invention advantageously has a mesopore volume, $V_{meso}$, defined as the volume of the pores with a diameter comprised between 2 and 50 nm inclusive, of at least 0.70 ml/g, and preferably of at least 0.75 ml/g.

The median mesopore diameter ($D_{p\ meso}$) the mesopore volume being the volume corresponding to the pores with a diameter comprised between 2 and 50 nm inclusive, is advantageously comprised between 18 and 25 nm, preferably comprised between 19 and 23 nm, very preferably comprised between 20 nm and 23 nm inclusive.

The median macropore diameter ($D_{p\ macro}$), the macropore volume, $V_{50\ nm}$, being defined as the volume of the pores with a diameter greater than 50 nm, is advantageously comprised between 100 nm and 1200 nm, preferably between 110 nm and 1000 nm, very preferably between 120 and 800 nm.

The catalyst support according to the present invention advantageously has a BET specific surface area ($S_{BET}$) of at least 110 m$^2$/g, preferably at least 120 m$^2$/g and even more preferably comprised between 120 and 160 m$^2$/g. By BET surface area is meant the specific surface area determined by nitrogen adsorption according to standard ASTM D 3663-78 based on the BRUNAUER-EMMET-TELLER method described in the periodical "The Journal of the American Chemical Society", 60, 309 (1938).

The preparation process according to the present invention in particular offers the benefit of leading to a porous alumina oxide support having mechanical strength that is entirely satisfactory relative to the pore volumes that characterize it, said strength being expressed by the value of the grain-to-grain crushing strength GGC, preferably of at least 0.5 daN/mm, very preferably of at least 0.8 daN/mm. The method for measuring the grain-to-grain crushing strength (GGC) consists of measuring the maximum compressive force that an extrudate can withstand before it fractures, when the product is placed between two flat surfaces moving at a constant speed of 5 cm/min. Compression is applied perpendicularly to one of the generating lines of the extrudate, and the grain-to-grain crushing strength is expressed as the ratio of the force to the length of the generating line of the extrudate.

Characteristics of the Catalyst

The finished catalyst, i.e. with the metals deposited on its surface by any method known to a person skilled in the art, as is described below, consequently has the following textural properties.

The catalyst according to the invention advantageously has a total pore volume (TPV) of at least 0.75 ml/g, preferably at least 0.85 ml/g, and very preferably at least 0.90 ml/g, as determined with a mercury intrusion porosimeter.

The catalyst used according to the invention advantageously has a macropore volume, $V_{50\ nm}$, comprised between 15 and 40% of the total pore volume, preferably between 17 and 35% of the total pore volume. In a very preferred embodiment, the macropore volume represents between 20 and 30% of the total pore volume.

The mesopore volume, $V_{meso}$, of the catalyst is at least 0.65 ml/g, and preferably at least 0.70 ml/g.

The median mesopore diameter is advantageously comprised between 18 nm and 26 nm, preferably between 19 nm and 25 nm and very preferably between 20 and 24 nm inclusive.

The median macropore diameter is advantageously comprised between 100 and 1200 nm, preferably between 110 and 1000 nm, very preferably between 120 and 800 nm inclusive.

The catalyst used according to the present invention advantageously has a BET specific surface area ($S_{BET}$) of at least 100 m$^2$/g, preferably of at least 110 m$^2$/g and even more preferably comprised between 120 and 150 m$^2$/g.

Preparation of the Oxide Support of the Catalyst

The porous alumina oxide used in the support of the catalyst according to the present invention is a bimodal, macroporous and mesoporous, porous alumina oxide.

Preferably, the mesoporous porous alumina oxide is devoid of micropores.

Preferably, the porous alumina oxide advantageously has a specific surface area greater than 110 m$^2$/g.

Very preferably, the specific surface area of the porous alumina oxide is greater than 120 m$^2$/g.

Even more preferably, the specific surface area of the porous alumina oxide is comprised between 120 and 160 m$^2$/g.

The mesopore volume, defined as the volume comprised in the pores having a median diameter comprised between 2 and 50 nm, is measured by mercury porosimetry. According to the invention, the mesopore volume of the porous alumina oxide is greater than or equal to 0.70 ml/g, very preferably greater than or equal to 0.75 ml/g.

The porous alumina oxide support of said catalyst according to the invention generally comprises an alumina content greater than or equal to 90% and a silica content in SiO$_2$ equivalent of at most 10% by weight relative to the final oxide, preferably a silica content less than 5% by weight, very preferably a content less than 2% by weight. The silica may be introduced by any technique known to a person skilled in the art, for example during synthesis of the alumina gel or during the co-mixing stage.

Preferably, the alumina oxide support according to the invention consists exclusively of alumina.

Very preferably, the alumina oxide support according to the invention is a non-mesostructured alumina.

The porous alumina oxide support prepared according to the invention is obtained by filtration, drying, forming and thermal treatment of a specific alumina gel. Preparation of said alumina gel comprises three successive stages: a) stage of dissolution of an acidic alumina precursor, b) stage of adjustment of the pH of the suspension by means of a basic precursor, and c) stage of co-precipitation of at least one acidic precursor and at least one basic precursor, at least one of the two containing aluminium. At the end of the actual synthesis of the alumina gel, i.e. at the end of stage c), the final alumina concentration in the suspension must be comprised between 10 and 38 g/L, preferably between 13 and 35 g/L and more preferably between 15 and 33 g/L.

a) Dissolution Stage

Stage a) is a stage of dissolution of an acidic aluminium precursor in water, carried out at a temperature comprised between 20 and 80° C., preferably between 20 and 75° C. and more preferably between 30 and 70° C. The acidic aluminium precursor is selected from aluminium sulphate, aluminium chloride and aluminium nitrate, preferably aluminium sulphate. The pH of the suspension obtained is comprised between 0.5 and 5, preferably between 1 and 4, preferably between 1.5 and 3.5. This stage advantageously contributes to a quantity of alumina introduced relative to the final alumina comprised between 0.5 and 4% by weight, preferably between 1 and 3% by weight, very preferably between 1.5 and 2.5% by weight. The suspension is stirred for a duration comprised between 2 and 60 minutes, and preferably from 5 to 30 minutes.

b) pH Adjustment Stage

The pH adjustment stage b) consists of adding, to the suspension obtained in stage a), at least one basic precursor selected from sodium aluminate, potassium aluminate, ammonia, sodium hydroxide and potassium hydroxide.

Preferably, the basic precursor is an alumina precursor selected from sodium aluminate and potassium aluminate. Very preferably, the basic precursor is sodium aluminate.

Stage b) is carried out at a temperature comprised between 20 and 90° C., preferably comprised between 20 and 80° C. and more preferably between 30 and 70° C. and at a pH comprised between 7 and 10, preferably between 8 and 10, preferably between 8.5 and 10 and very preferably between 8.7 and 9.9. The duration of pH adjustment stage b) is comprised between 5 and 30 minutes, preferably between 8 and 25 minutes, and very preferably between 10 and 20 minutes.

c) Co-Precipitation Stage

Stage c) is a stage of precipitation by bringing into contact, in an aqueous reaction medium, at least one basic precursor selected from sodium aluminate, potassium aluminate, ammonia, sodium hydroxide and potassium hydroxide and at least one acidic precursor selected from aluminium sulphate, aluminium chloride, aluminium nitrate, sulphuric acid, hydrochloric acid and nitric acid, at least one of the basic or acidic precursors comprising aluminium, said precursors being selected to be identical or not identical to the precursors introduced in stages a) and b). The relative flow rate of the acidic and basic precursors is selected so as to obtain a pH of the reaction medium comprised between 7 and 10 and the flow rate of the acidic and basic precursor or precursors containing aluminium is controlled so as to obtain a final alumina concentration in the suspension comprised between 10 and 38 g/L, preferably between 13 and 35 g/L and more preferably between 15 and 33 g/L.

Preferably, the co-precipitation stage is carried out at a temperature comprised between 20 and 90° C., and more preferably between 30 and 70° C.

The precipitation stage c) is carried out at a pH comprised between 7 and 10, preferably between 8 and 10, more preferably between 8.5 and 10 and very preferably between 8.7 and 9.9.

The co-precipitation stage c) is carried out for a duration comprised between 1 and 60 minutes, and preferably from 5 to 45 minutes.

Preferably, said stages a), b), and c) are carried out in the absence of organic additive.

Preferably, synthesis of the alumina gel (stages a), b) and c)) is carried out with stirring.

d) Filtration Stage

Preferably, the process for preparation of the alumina according to the invention also comprises a stage of filtration of the suspension obtained at the end of stage c).

Said filtration stage is carried out by the methods known to a person skilled in the art.

Said filtration stage is advantageously followed by at least one stage of washing, with an aqueous solution, preferably with water and preferably by one to three stages of washing, with a quantity of water equal to the quantity of precipitate filtered.

e) Drying Stage

According to the invention, the alumina gel obtained at the end of precipitation stage c), followed by a filtration stage d), is dried in a drying stage e) in order to obtain a powder, said drying stage being implemented advantageously by drying at a temperature greater than or equal to 120° C. or by spray-drying or by any other drying technique known to a person skilled in the art.

In the case where said drying stage e) is implemented by drying at a temperature greater than or equal to 120° C., said drying stage e) may advantageously be carried out in a closed and ventilated stove. Preferably, said drying stage takes place at a temperature comprised between 120 and 300° C., very preferably at a temperature comprised between 150 and 250° C.

In the case where said drying stage e) is implemented by spray-drying, the cake obtained at the end of the co-precipitation stage, followed by a filtration stage, is resuspended. Said suspension is then atomized into fine droplets, in a vertical cylindrical chamber in contact with a hot air flow in order to evaporate the water in accordance with the principle that is well known to a person skilled in the art. The powder obtained is entrained by the heat flux to a cyclone or a bag filter, which will separate the air from the powder.

Preferably, in the case where said drying stage e) is implemented by spray-drying, the spray-drying is carried out according to the operating procedure described in the publication Asep Bayu Dani Nandiyanto, Kikuo Okuyama, Advanced Powder Technology, 22, 1-19, 2011.

f) Forming Stage

According to the invention, the powder obtained at the end of the drying stage e) is formed in a stage f) in order to obtain a crude material.

By "crude material" is meant the material that has been formed and has not undergone stages of thermal treatment.

Preferably, said forming stage f) is carried out by mixing-extrusion, by granulation, by the oil drop technique, or by pelletization.

Very preferably, said forming stage f) is carried out by mixing-extrusion.

Advantageously, forming is carried out with a level of acid (total, expressed relative to dry alumina) comprised between 0 and 4% and preferably between 0.5 and 1.5%, and a degree of neutralization comprised between 0 and 200% and preferably between 0 and 40%. The acidic and basic losses on ignition are advantageously comprised between 60 and 70%.

g) Stage of Thermal Treatment

According to the invention, the crude material obtained at the end of the forming stage f) then undergoes a stage g) of thermal treatment at a temperature comprised between 500 and 1000° C., for a duration advantageously comprised between 2 and 10 h, in the presence or absence of an air flow containing up to 60% by volume of water.

Preferably, said thermal treatment is carried out in the presence of an air flow containing water.

Preferably, said stage g) of thermal treatment takes place at a temperature comprised between 540° C. and 850° C.

Preferably, said stage g) of thermal treatment takes place for a duration comprised between 2 h and 10 h.

Said stage g) of thermal treatment allows transition of boehmite to the final alumina.

The stage of thermal treatment may be preceded by drying at a temperature comprised between 50° C. and 120° C., according to any technique known to a person skilled in the art.

Characteristics of the Porous Amorphous Alumina Oxide Obtained

The preparation process according to the invention makes it possible to obtain a porous amorphous, bimodal macroporous and mesoporous alumina oxide having a large median mesopore diameter, greater than or equal to 18 nm, determined on the pore distribution curve by volume with the mercury intrusion porosimeter.

The mesoporous alumina oxide support prepared according to the process of the invention is advantageously devoid of micropores. The absence of micropores is verified by nitrogen porosimetry.

The mesoporous alumina oxide support according to the invention advantageously has a mesopore volume, i.e. contained in the pores with a diameter comprised between 2 and 50 nm, as measured with a mercury intrusion porosimeter, greater than or equal to 0.70 ml/g, preferably greater than or equal to 0.75 ml/g.

The total pore volume measured by mercury porosimetry is advantageously greater than 0.80 ml/g.

The mesoporous alumina oxide support according to the invention generally comprises a macropore volume, $V_{50\ nm}$, defined as the volume of the pores with a diameter greater than 50 nm, as measured with a mercury intrusion porosimeter, between 10 and 35% of the total pore volume and preferably between 15 and 30% of the total pore volume. In a very preferred embodiment, the macropore volume represents between 20 and 30% of the total pore volume.

The mesoporous alumina oxide support according to the invention generally has a specific surface area greater than 110 m$^2$/g.

The support of the catalyst according to the invention comprises mainly (at least 90% by weight) an alumina oxide as described above and may also contain dopants such as the elements silicon, titanium and zirconium (up to a content of 10% by weight).

The support of the catalyst according to the invention described above is usually used in the form of powder, beads, pellets, granules or extrudates, the forming operations being carried out by the conventional techniques known to a person skilled in the art. There may be mentioned for example the methods of forming by extrusion, by pelletization, by the oil drop method, or by granulation with a rotating plate.

Preparation of the Catalyst

The catalyst according to the invention is obtained by deposition of at least one group VIB metal, optionally of at least one group VIII metal and optionally of other elements such as the element phosphorus on the support of the catalyst according to the invention described above.

Said deposition may be carried out by all the methods known to a person skilled in the art.

In particular, said deposition on the alumina described above may be carried out by all of the methods of impregnation known to a person skilled in the art, including dry impregnation. Preferably, at least one group VIB metal, optionally at least one group VIII metal and optionally the element phosphorus are deposited by dry impregnation of their associated compounds on the oxide support according to the invention. Deposition may be carried out in a single stage of dry impregnation of the oxide support according to the invention using a solution containing, simultaneously, at least one compound of at least one group VIB metal, optionally at least one phosphorus-containing compound, and optionally at least one compound of at least one group VIII metal.

Deposition may also advantageously be carried out in at least two cycles of dry impregnation. The various elements may thus advantageously be impregnated successively or one of the elements may also be impregnated in several sequences. One of the impregnations that is carried out may in particular serve for using an organic compound that a person skilled in the art wishes to introduce in addition to the constituent elements of the final catalyst.

Said solution(s) may be aqueous, consisting of an organic solvent or of a mixture of water and at least one organic solvent (for example ethanol or toluene). Preferably, the solution is aqueous-organic and even more preferably aqueous-alcoholic. The pH of this solution can be modified by the optional addition of an acid.

The compounds that may be added to the solution as sources of group VIII elements advantageously include: citrates, oxalates, carbonates, hydroxycarbonates, hydroxides, phosphates, sulphates, aluminates, molybdates, tungstates, oxides, nitrates, halides, for example chlorides, fluorides, bromides, acetates, or any mixture of the compounds listed here.

The sources of the group VIB element that are well known to a person skilled in the art advantageously include, for example for molybdenum and tungsten: the oxides, hydroxides, molybdic and tungstic acids and salts thereof, in particular the ammonium salts, ammonium heptamolybdate, ammonium tungstate, phosphomolybdic acid, phosphotungstic acid and salts thereof. The oxides or the ammonium salts such as ammonium molybdate, ammonium heptamolybdate or ammonium tungstate are preferably used.

The preferred source of phosphorus is orthophosphoric acid, but its salts and esters such as the alkaline phosphates, ammonium phosphate, gallium phosphate or alkyl phosphates are also suitable. The phosphorous acids, for example hypophosphorous acid, phosphomolybdic acid and its salts, phosphotungstic acid and its salts may be used advantageously.

A chelating agent of an organic nature may advantageously be added to the solution if this is deemed necessary by a person skilled in the art Preferably, the whole of the metallic phase is introduced at the end of preparation of the support and therefore no additional stage is necessary.

Preferably, a single stage of impregnation of at least one group VIB metal, optionally at least one group VIII metal and optionally the element phosphorus on the alumina oxide support previously obtained, according to any of the methods of impregnation described above, is selected.

The product is then generally ripened, dried and optionally calcined under an oxidizing atmosphere, for example under air, usually at a temperature from approximately 300 to 600° C., preferably 350 to 550° C.

In an embodiment, the catalyst according to the invention described above undergoes a stage of thermal or hydrothermal treatment.

Preferably, this treatment is generally carried out in two phases. Firstly, the solid is dried at a temperature below 200° C. under air, preferably below 150° C. Secondly, calcination is carried out under air, without further addition of water, at a temperature preferably comprised between 300 and 600° C., and very preferably comprised between 400 and 500° C.

In another embodiment, the catalyst does not undergo a supplementary stage of thermal or hydrothermal treatment, and advantageously the catalyst is only dried. In this case, the drying temperature is below 200° C.

The catalyst according to the present invention is advantageously used in the fully or partially sulphurized form. Therefore before use it undergoes a stage of activation under a sulpho-reducing atmosphere by any method known to a person skilled in the art, in situ or ex situ.

The sulphurization treatment may be carried out ex situ (before introducing the catalyst into the hydrotreating/hydroconversion reactor) or in situ by means of an organosulphur agent that is a precursor of H$_2$S, for example DMDS (dimethyl disulphide), Processes for Using the Catalyst According to the Invention The invention describes the use of a catalyst comprising at least one group VIB metal, optionally at least one group VIII metal, optionally phosphorus, and an alumina oxide support, in a process for hydrotreating heavy feedstocks such as petroleum residues (atmospheric or vacuum residues).

The processes according to the invention advantageously use the catalyst described according to the invention in hydrotreating processes for converting heavy hydrocarbon feedstocks containing sulphur impurities and metallic impurities.

In general, the hydrotreating processes for converting heavy hydrocarbon feedstocks, containing sulphur impurities and metallic impurities, take place at a temperature comprised between 320 and 450° C., under a hydrogen partial pressure comprised between 3 MPa and 30 MPa, at a space velocity advantageously comprised between 0.05 and 10 volumes of feedstock per volume of catalyst per hour, and with a ratio of gaseous hydrogen to liquid hydrocarbon feedstock advantageously comprised between 100 and 5000 normal cubic metres per cubic metre.

An objective of using the catalysts of the present invention relates to improvement of in particular hydrodemetallization performances relative to the known catalysts of the prior art.

The catalyst described gives an improvement in hydrodemetallization (HDM) and in hydrodeasphalting relative to the conventional catalysts, while displaying considerable stability over time.

Feedstocks

The feedstocks treated in the process according to the invention are advantageously selected from atmospheric residues, vacuum residues resulting from direct distillation, deasphalted oils, residues from conversion processes such as for example those originating from coking, from fixed-bed, ebullating-bed, or moving-bed hydroconversion, used alone or in a mixture. These feedstocks may advantageously be used as they are or diluted with a hydrocarbon fraction or a mixture of hydrocarbon fractions that may be selected from the products originating from the FCC process, a light cut oil (or light cycle oil, LCO), a heavy cut oil (heavy cycle oil, HCO), a decanted oil (DO), a slurry, or may result from distillation, the gas oil fractions in particular those obtained by vacuum distillation called VGO (vacuum gas oil). The heavy feedstocks may thus advantageously comprise cuts originating from coal liquefaction, aromatic extracts, or any other hydrocarbon cut.

Said heavy feedstocks generally have more than 1% by weight of molecules having a boiling point greater than 500° C., a cumulative metals content (for example Ni+V) greater than 1 ppm by weight, preferably greater than 20 ppm by weight, very preferably greater than 50 ppm by weight, a content of asphaltenes, precipitated in heptane, greater than 0.05% by weight, preferably greater than 1% by weight, very preferably greater than 2%.

The heavy feedstocks may advantageously also be mixed with coal in powder form, this mixture generally being called slurry. These feedstocks may advantageously be by-products originating from coal conversion, mixed again with fresh coal. The content of coal in the heavy feedstock is generally and preferably ¼ ratio (oil/coal) and may advantageously vary widely between 0.1 and 1. The coal may contain lignite, it may be a sub-bituminous or bituminous coal. Any other type of coal is suitable for use of the invention, either in fixed-bed reactors or in reactors with ebullating bed operation.

According to the invention, the catalyst according to the latter is preferably used in the first catalyst beds of a process comprising successively at least one stage of hydrodemetallization and at least one stage of hydrodesulphurization. The process according to the invention is advantageously implemented in one to ten successive reactors, and the catalyst or catalysts according to the invention may advantageously be loaded into one or more reactors and/or into some or all of the reactors.

In a preferred embodiment, switchable reactors, i.e. reactors operating alternately, in which hydrodemetallization (HDM) catalysts according to the invention may preferably be utilized, may be used upstream of the unit. In this preferred embodiment, the switchable reactors are then followed by reactors in series, in which hydrodesulphurization (HDS) catalysts are utilized, which may be prepared by any method known to a person skilled in the art.

In a very preferred embodiment, two switchable reactors are used upstream of the unit, advantageously for HDM and containing one or more catalysts according to the invention. They are followed advantageously by one to four reactors in series, advantageously used for HDS.

The process according to the invention may advantageously be implemented in a fixed bed with the objective of removing the metals and sulphur and of lowering the average boiling point of the hydrocarbons. In the case where the process according to the invention is implemented in a fixed bed, the operating temperature is advantageously comprised between 320° C. and 450° C., preferably 350° C. to 410° C., under a hydrogen partial pressure advantageously comprised between 3 MPa and 30 MPa, preferably between 10 and 20 MPa, at a space velocity advantageously comprised between 0.05 and 5 volumes of feedstock per volume of catalyst per hour, and with a ratio of gaseous hydrogen to liquid hydrocarbon feedstock advantageously comprised between 200 and 5000 normal cubic metres per cubic metre, preferably 500 to 1500 normal cubic metres per cubic metre.

The process according to the invention may also advantageously be implemented partly in an ebullating bed on the same feedstocks. In the case where the process according to the invention is implemented in an ebullating bed, the catalyst is advantageously utilized at a temperature comprised between 320 and 450° C., under a hydrogen partial pressure advantageously comprised between 3 MPa and 30 MPa, preferably between 10 and 20 MPa, at a space velocity advantageously comprised between 0.1 and 10 volumes of feedstock per volume of catalyst per hour, preferably between 0.5 and 2 volumes of feedstock per volume of catalyst per hour, and with a ratio of gaseous hydrogen to liquid hydrocarbon feedstock advantageously comprised between 100 and 3000 normal cubic metres per cubic metre, preferably comprised between 200 and 1200 normal cubic metres per cubic metre.

According to a preferred embodiment, the process according to the invention is carried out in a fixed bed.

Before being utilized in the process according to the invention, the catalysts of the present invention are preferably subjected to a sulphurization treatment making it possible to transform, at least partly, the metallic species to sulphide before they are brought into contact with the feedstock to be treated. This treatment of activation by sulphurization is well known to a person skilled in the art and may be carried out by any method already known and already described in the literature. A conventional method of sulphurization well known to a person skilled in the art consists of heating the mixture of solids under a flow of a mixture of hydrogen and hydrogen sulphide or under a flow of a mixture of hydrogen and hydrocarbons containing sulphur-containing molecules at a temperature comprised between 150 and 800° C., preferably between 250 and 600° C., generally in a traversed bed reaction zone.

The sulphurization treatment may be carried out ex situ (before introducing the catalyst into the hydrotreating/hydroconversion reactor) or in situ by means of an organosulphur agent that is a precursor of $H_2S$, for example DMDS (dimethyl disulphide).

The following examples illustrate the invention but without however limiting its scope.

EXAMPLES

Example 1

Preparation of Catalyst Supports A, AA and CA (Sccording to the Invention)

Preparation of Supports A and CA

For preparation of the catalyst supports A and CA, 5 l of solution is prepared with a final alumina concentration fixed at 15 g/l and with a level of contribution of the first stage at 2.1% by weight of the final alumina.

Stage a) of Dissolution:

39 mL of aluminium sulphate is introduced into the reactor containing the water base in one go. The evolution of the pH, which remains comprised between 2.5 and 3, is monitored for 10 min.

Stage b) of Adjustment of pH:

After the aluminium sulphate dissolution stage, approximately 40 mL of sodium aluminate is added gradually. The aim is to reach a pH comprised between 7 and 10 in the space of 5 to 15 min.

Stage c) of Co-Precipitation:

The following are added, in 30 min, to the suspension obtained in stage b):
567 mL of aluminium sulphate, i.e. a flow rate of 20 mL/min,
567 mL of sodium aluminate, i.e. a flow rate of 19 mL/min,
639 mL of distilled water, i.e. a flow rate of 22 mL/min.
The pH of co-precipitation is maintained between 7 and 10 by controlling the flow rate of the sodium aluminate pump as a priority.

At the end of the synthesis, the suspension is filtered and washed several times.

The cake is overdried in a stove as a minimum overnight at 200° C. The powder is obtained, which has to be formed.

The main characteristics of the gel obtained, which is used in forming, are presented in Table 1.

TABLE 1

Typical characteristics of the gel used for preparing the alumina

| Phase detected in XRD | Loss on ignition (% w/w) | Content of S (ppm) | Content of Na (ppm) |
|---|---|---|---|
| Boehmite | 20.7 | 350 | 60 |

Forming the Alumina Gel

Forming is carried out in a mixer of the Brabender type with an acid level (total, expressed relative to dry alumina) of 1%, a degree of neutralization of 20% and acidic and basic losses on ignition of 62 and 64% respectively.

Extrusion is carried out on a ram extruder (speed of extrusion 50 cm/min and trilobed die with a diameter of 2.1 mm).

Calcination: The extrudates obtained are dried at 100° C. overnight, and then calcined,
either for 2 h at 800° C. under a moist air flow in a tubular furnace (LHSV=1 l/h/g with 50% v/v of water), resulting in support A,
or for 2 h at 700° C. under a moist air flow in a tubular furnace (LHSV=1 l/h/g with 30% v/v of water), which results in the extrudates of support CA.

The pore distribution of the alumina obtained is characterized using a mercury intrusion porosimeter according to standard ASTM D4284-83 at a maximum pressure of 4000 bar (400 MPa), using a surface tension of 484 dyne/cm and a contact angle of 140°. Absence of microporosity is verified by nitrogen porosimetry. These data are summarized in Table 3.

Preparation of Support AA

For preparation of catalyst support AA, 5 l of solution is prepared at a final alumina concentration fixed at 27 g/l and with a level of contribution of the first stage at 2.1% by weight of the final alumina.

The concentrations of the aluminium precursors used are as follows: $Al_2(SO_4)$ at 102 g/l as $Al_2O_3$ and NaAlOO at 155 g/l as $Al_2O_3$. The stirring speed is 350 rpm throughout the synthesis.

Stage a) of Dissolution:

70 ml of aluminium sulphate is introduced into the reactor containing the water base in one go. The evolution of the pH, which remains comprised between 2.5 and 3, is monitored for 10 min.

Stage b) of Adjustment of pH:

After the aluminium sulphate dissolution stage, approximately 70 ml of sodium aluminate is added gradually. The aim is to reach a pH comprised between 7 and 10 in the space of 5 to 15 min.

Stage c) of Co-Precipitation:

The following are added, in 30 min, to the suspension obtained in stage b):
1020 ml of aluminium sulphate, i.e. a flow rate of 34 ml/min,
1020 ml of sodium aluminate, i.e. a flow rate of 34 ml/min,
1150 ml of distilled water, i.e. a flow rate of 38.3 ml/min.
The pH of co-precipitation is maintained between 7 and 10 by controlling the flow rate of the sodium aluminate pump as a priority.

At the end of the synthesis, the suspension is filtered and washed several times.

The cake is overdried in a stove as a minimum overnight at 200° C. The powder is obtained, which has to be formed.

The main characteristics of the gel obtained, which is used in forming, are presented in Table 2.

TABLE 2

Typical characteristics of the gel used for preparing the alumina

| Phase detected in XRD | Loss on ignition (% w/w) | Content of S (ppm) | Content of Na (ppm) |
|---|---|---|---|
| Boehmite | 20.7 | 350 | 60 |

Forming the Alumina Gel

Forming is carried out in a mixer of the Brabender type with an acid level (total, expressed relative to dry alumina) of 1%, a degree of neutralization of 20% and acidic and basic losses on ignition of 62 and 64% respectively.

Extrusion is carried out on a ram extruder (speed of extrusion 50 cm/min and trilobed die with a diameter of 2.1 mm).

Calcination: The extrudates obtained are dried at 100° C. overnight, and then calcined for 2 h at 800° C. under a moist air flow in a tubular furnace (LHSV=1 l/h/g with 50% v/v of water).

The pore distribution of the alumina obtained is characterized using a mercury intrusion porosimeter according to standard ASTM D4284-83 at a maximum pressure of 4000 bar (400 MPa), using a surface tension of 484 dyne/cm and a contact angle of 140°. The absence of microporosity is verified by nitrogen porosimetry. These data are summarized in Table 3.

Example 2

Preparation of Catalyst Support B (Comparative)

The concentrations of the aluminium precursors used are as follows: $Al_2(SO_4)$=at 102 g/l as $Al_2O_3$ and NaAlOO at 155 g/l as $Al_2O_3$. The stirring speed is 350 rpm throughout the synthesis.

The first stage consists of rapid dehydration of 20.61 g of gibbsite at high temperature (800° C.) for a short contact time (0.8 second), giving a χ (chi) transition alumina powder.

Washing to lower the $Na_2O$ content was carried out with water (3 kg/kg of $Al_2O_3$), followed by a second rapid dehydration treatment similar to the preceding one, also making it possible to obtain an alumina powder.

This powder is formed by granulation in a bowl granulator.

A hydrothermal treatment is carried out at high water partial pressure (100%) for 8 h. The beads thus obtained were dried at 150° C., and then calcined at 600° C.

The pore distribution of the alumina obtained is characterized using a mercury intrusion porosimeter according to standard ASTM D4284-83 at a maximum pressure of 4000 bar (400 MPa), using a surface tension of 484 dyne/cm and a contact angle of 140°. Absence of microporosity is verified by nitrogen porosimetry. These data are summarized in Table 3.

Example 3

Preparation of Catalyst Supports D and CD (Comparative)

For preparation of catalyst supports D and CD, 5 l of solution is prepared at a final alumina concentration fixed at 40 g/l (non-compliant) and with a level of contribution of the first stage at 2.1% by weight of the total alumina.

The concentrations of the aluminium precursors used are as follows: $Al_2(SO_4)$=at 102 g/L as $Al_2O_3$ and NaAlOO at 155 g/L as $Al_2O_3$. The stirring speed is 350 rpm throughout the synthesis.

Stage a) of Dissolution:

103 ml of aluminium sulphate is introduced into the reactor containing the water base in one go. The evolution of the pH, which remains comprised between 2.5 and 3, is monitored for 10 min.

Stage b) of Adjustment of pH:

After the aluminium sulphate dissolution stage, approximately 103 ml of sodium aluminate is added gradually. The aim is to reach a pH comprised between 7 and 10 in the space of 5 to 15 min.

Stage c) of Co-Precipitation:

The following are added, in 30 min, to the suspension obtained in stage b):

1515 ml of aluminium sulphate, i.e. a flow rate of 51 ml/min,
1515 ml of sodium aluminate, i.e. a flow rate of 51 ml/min,
1710 ml of distilled water, i.e. a flow rate of 58 ml/min.

The pH of co-precipitation is maintained between 7 and 10 by controlling the flow rate of the sodium aluminate pump as a priority.

At the end of the synthesis, the suspension is filtered and washed several times.

The cake is overdried in a stove as a minimum overnight at 200° C. The powder is obtained, which has to be formed.

Forming the Alumina Gel

Forming is carried out in a mixer of the Brabender type with an acid level (total, expressed relative to dry alumina) of 1%, a degree of neutralization of 20% and acidic and basic losses on ignition of 62 and 64% respectively.

Extrusion is carried out on a ram extruder (speed of extrusion 50 cm/min and trilobed die with a diameter of 2.1 mm).

The extrudates obtained are dried at 100° C. overnight, and then calcined,
  either for 2 h at 800° C. under a moist air flow in a tubular furnace (LHSV=1 l/h/g with 50% v/v of water) to give support D,
  or for 2 h at 700° C. under a moist air flow in a tubular furnace (LHSV=1 l/h/g with 30% v/v of water), which results in the extrudates of support CD.

The pore distribution of the alumina obtained is characterized using a mercury intrusion porosimeter according to standard ASTM D4284-83 at a maximum pressure of 4000 bar (400 MPa), using a surface tension of 484 dyne/cm and a contact angle of 140°. The absence of microporosity is verified by nitrogen porosimetry. These data are summarized in Table 3.

Example 4

Preparation of Catalyst Supports E and CE, According to U.S. Pat. No. 7,790,562 (Comparative)

Firstly an alumina gel is synthesized that is non-compliant in that it is synthesized according to the preparation process described in patent U.S. Pat. No. 7,790,562.

Synthesis is carried out in a 7-litre reactor and a final suspension of 5 l in two precipitation stages. The quantity of water added to the reactor is 3960 ml.

The final alumina concentration required is 30g/l.

A first stage of co-precipitation of aluminium sulphate $Al_2(SO_4)$ and of sodium aluminate NaAlOO is carried out at 30° C. and pH=9.3 for a duration of 8 minutes. The concentrations of the aluminium precursors used are as follows: $Al_2(SO_4)$=at 102 g/l as $Al_2O_3$ and NaAlOO at 155g/l as $Al_2O_3$. The stirring speed is 350 rpm throughout the synthesis.

A solution of aluminium sulphate $Al_2(SO_4)$ is added continuously for 8 minutes at a flow rate of 19.6 ml/min to a solution of sodium aluminate NaAlOO according to a base/acid weight ratio=1.80 so as to adjust the pH to a value of 9.3. The temperature of the reaction medium is maintained at 30° C.

A suspension containing an alumina precipitate is obtained.

As the required final alumina concentration is 30 g/l, the flow rate of the aluminium-containing precursors aluminium sulphate $Al_2(SO_4)$ and sodium aluminate NaAlOO introduced in the first stage of precipitation are 19.6 ml/min and 23.3 ml/min respectively.

These flow rates of acidic and basic precursors containing aluminium make it possible to obtain a degree of progression of 30% at the end of the first precipitation stage.

The suspension obtained is then subjected to a temperature rise from 30 to 57° C.

A second stage of co-precipitation of the suspension obtained is then carried out by adding aluminium sulphate $Al_2(SO_4)$ at a concentration of 102 g/l as $Al_2O_3$ and sodium aluminate NaAlOO at a concentration of 155 g/l as $Al_2O_3$. A solution of aluminium sulphate $Al_2(SO_4)$ is therefore added continuously to the heated suspension obtained at the end of the first stage of precipitation for 30 minutes at a flow rate of 12.8 ml/min to a solution of sodium aluminate NaAlOO according to a base/acid weight ratio=1.68 so as to adjust the pH to a value of 8.7. The temperature of the reaction medium in the second stage is maintained at 57° C.

A suspension containing an alumina precipitate is obtained.

As the required final alumina concentration is 30g/l, the flow rates of the aluminium-containing precursors aluminium sulphate $Al_2(SO_4)$ and sodium aluminate NaAlOO introduced in the second precipitation stage are 12.8 ml/min and 14.1 ml/min respectively.

These flow rates of acidic and basic precursors containing aluminium make it possible to obtain a degree of progression of 70% at the end of the second precipitation stage.

The suspension obtained is then filtered by displacement of water in a device of the Buchner frit type and the alumina gel obtained is washed 3 times with 5 l of distilled water at 70° C.

Forming the Alumina Gel

Forming is carried out in a mixer of the Brabender type with an acid level (total, expressed relative to dry alumina) of 3%, a degree of neutralization of 40% and acidic and basic losses on ignition of 61 and 63% respectively.

Extrusion is carried out on a ram extruder (speed of extrusion 50 cm/min and trilobed die with a diameter of 2.1 mm).

Calcination: The extrudates obtained are dried at 100° C. overnight, and then calcined:
- either for 2 h at 800° C. under a moist air flow in a tubular furnace (LHSV=1 l/h/g with 50% v/v of water): these extrudates give support E.
- or for 2 h at 700° C. under a moist air flow in a tubular furnace (LHSV=1 l/h/g with 30% v/v of water), which results in the extrudates of support CE.

The pore distribution of the alumina obtained is characterized using a mercury intrusion porosimeter according to standard ASTM D4284-83 at a maximum pressure of 4000 bar (400 MPa), using a surface tension of 484 dyne/cm and a contact angle of 140°. Absence of microporosity is verified by nitrogen porosimetry. These data are summarized in Table 3.

Example 5

Preparation of catalysts A1, AA1, CA1 (According to the Invention), B1, D1, CD1, E1, CE1 (Comparative)

Catalysts A1, AA1, CA1, B1, D1, CD1, E1, CE1 were prepared starting from supports A, AA, CA, B, D, CD, E, and CE respectively. For this purpose, the dry impregnation method was used. The aqueous impregnation solution contains salts of molybdenum and nickel as well as phosphoric acid ($H_3PO_4$) and hydrogen peroxide ($H_2O_2$). The molybdenum salt is ammonium heptamolybdate $Mo_7O_{24}(NH_4)_6 \cdot 4H_2O$ and the nickel salt is nickel nitrate $Ni(NO_3)_2 \cdot 6H_2O$. The quantities of each of these salts in solution were determined so as to deposit the desired quantity of each element in the catalyst.

After ripening at ambient temperature in a water-saturated atmosphere, the extrudates of the impregnated support are dried overnight at 120° C. and then calcined at 500° C. for 2 hours under air. The target content of molybdenum trioxide is 6% by weight, that of nickel oxide is 1.5% by weight, and that of phosphorus pentoxide is 1.2% by weight. The P/Mo atomic ratio is equal to 0.4 and the Ni/Mo atomic ratio is equal to 0.49. The concentrations of solutions were therefore adjusted to meet this target, taking into account the volume of water uptake of the different supports, the latter being determined conventionally, as well known to a person skilled in the art.

Example 6

Evaluation of catalysts A1, AA1, CA1 (According to the Invention) in HDT of Residues, in Comparison with Catalysts B1, D1, CD1, E1, CE1 (Comparative)

Catalysts A1, CA1 and AA1 prepared according to the invention, as well as comparative catalysts B1, D1, CD1, E1, CE1, were subjected to a catalytic test in a perfectly stirred batch reactor, on a feedstock of the vacuum residue type Safaniya (Arabian Heavy) VR (see characteristics in Table 4).

TABLE 3

| | A | AA | CA | B | D | CD | E | CE | F |
|---|---|---|---|---|---|---|---|---|---|
| | according to the invention | | | | | comparative | | | |
| Total pore volume (ml/g) | 1.01 | 1.00 | 1.00 | 0.93 | 0.80 | 0.81 | 0.74 | 0.74 | 0.95 |
| Mesopore volume (ml/g) | 0.79 | 0.77 | 0.80 | 0.60 | 0.71 | 0.70 | 0.72 | 0.73 | 0.61 |
| Macropore volume (ml/g) | 0.22 | 0.23 | 0.20 | 0.33 | 0.09 | 0.11 | 0.02 | 0.01 | 0.34 |
| % Vmacro | 22% | 23% | 20% | 36% | 11% | 14% | 3% | 2% | 36% |
| $Dp_{meso}$ (nm) | 21.2 | 23.3 | 18.2 | 19.7 | 16.1 | 13.2 | 17.1 | 15.4 | 12.0 |
| $Dp_{macro}$ (nm) | 248 | 252 | 248 | 600 | 200 | 200 | — | — | 600 |
| $S_{BET}$ (m²/g) | 157 | 129 | 174 | 141 | 180 | 233 | 163 | 181 | 197 |

TABLE 4

Characteristics of the Safaniya VR feedstock used

|  |  | Safaniya VR |
|---|---|---|
| Density 15/4 |  | 1.0290 |
| Viscosity at 100° C. | mm²/s | 1678 |
| Sulphur | % by weight | 5.05 |
| Nitrogen | ppm | 3724 |
| Nickel | ppm | 47 |
| Vanadium | ppm | 148 |
| Conradson carbon | % by weight | 20 |
| C7 asphaltenes | % by weight | 14 |
| SARA |  |  |
| Saturates | % by weight | 11 |
| Aromatics | % by weight | 39 |
| Resins | % by weight | 34 |
| Asphaltenes | % by weight | 14 |
| Simulated distillation |  |  |
| IP | ° C. |  |
| 5% | ° C. | 459.6 |
| 10% | ° C. | 490.0 |
| 20% | ° C. | 531.2 |
| 30% | ° C. | 566.2 |
| 40% | ° C. | 597.6 |
| DS: EP ° C. | ° C. | 611.1 |
| DS: disti res | % by weight | 44.0 |

For this purpose, after an ex-situ sulphurization stage by circulation of an $H_2S/H_2$ gas mixture for 2 hours at 350° C., the batch reactor is charged with a volume of 15 ml of catalyst with exclusion of air, and this is then covered with 90 ml of feedstock. The operating conditions applied are then as follows:

TABLE 5

Operating conditions used in the batch reactor

| Total pressure | 9.5 MPa |
|---|---|
| Test temperature | 370° C. |
| Test duration | 3 hours |

At the end of the test, the reactor is cooled down and after triple stripping of the atmosphere under nitrogen (10 minutes at 1 MPa), the effluent is collected and analysed by X-ray fluorescence (sulphur and metals) and by simulated distillation (ASTM D7169).

The degree of hydrodesulphurization HDS is defined as follows:

$$HDS\ (\%) = ((\%\ by\ weight\ S)_{feedstock} - (\%\ by\ weight\ S)_{formula})/(\%\ by\ weight\ S)_{feedstock} \times 100$$

In the same way, the degree of hydrodemetallization HDM is defined as follows:

$$HDM\ (\%) = ((ppmw\ Ni+V)_{feedstock} - (ppmw\ Ni+V)_{formula})/(ppmw\ Ni+V)_{feedstock} \times 100$$

Finally, the degree of conversion of the 540° C.+ fraction is defined by the following relation:

$$HDX_{540+}(\%) = ((X_{540+})_{feedstock} - (X_{540+})_{effluent})/(X_{540+})_{feedstock} \times 100$$

The performances of the catalysts are summarized in Table 6.

TABLE 6

Performances in hydrodesulphurization HDS, hydrodemetallization HDM and hydroconversion HDX of catalysts A1, AA1, CA1 in comparison with catalysts B1, D1, CD1, E1, CE1

| Catalysts | HDS (%) | HDM (%) |
|---|---|---|
| A1 (according to the invention) | 47.3 | 81.2 |
| AA1 (according to the invention) | 43.8 | 81.1 |
| CA1 (according to the invention) | 48.6 | 79.1 |
| B1 (comparative) | 47.5 | 77.5 |
| D1 (comparative) | 48.1 | 74.4 |
| CD1 (comparative) | 49.3 | 71.4 |
| E1 (comparative) | 51.4 | 76.5 |
| CE1 (comparative) | 52.8 | 70.4 |

It is clear from Table 6 that use of the catalysts of the present invention leads to a significant gain in hydrodemetallization (HDM) that is never observed for the various textures of the existing art. A slight degradation in hydrodesulphurization (HDS) is observed, but it is not prohibitive as regards the aim of carrying out a sequence of tests, as is the case in industry.

In practice, the origin of the differences in activity is explained by the fact that the compliant supports A, AA, CA1 display, simultaneously, a mesopore volume above 0.75 ml/g, a pore diameter at least equal to 18 nm, a macropore volume of at least 15% of the total volume and an $S_{BET}$ above 100 m²/g. In contrast, supports CD and CE have pore diameters that are too small, supports D, E, CD and CE have macropore volumes that are too small and support B has a mesopore volume that is too small.

Example 7

Evaluation of catalysts A1, AA1, CA1 According to the Invention in Fixed-Bed Hydrotreating and Comparison with the Catalytic Performances of Catalysts B1, D1, and E1

The catalysts A1, AA1, CA1 described, prepared according to the invention, were compared in a test of hydrotreating of petroleum residues with the performances of catalysts B1, D1 and E1 for comparison. The feedstock consists of a mixture of an atmospheric residue (AR) of Middle East origin (Arabian Medium) and a vacuum residue (Arabian Light). Two separate mixtures were prepared for these evaluations. The corresponding feedstocks are characterized respectively by high contents of Conradson carbon (13.2 and 14.4% by weight) and asphaltenes (5.2 and 6.1% by weight) and a high level of nickel (22 to 25 ppm by weight), vanadium (67 to 79 ppm by weight) and sulphur (3.86 to 3.90% by weight). The complete characteristics of these feedstocks are presented in Table 7.

TABLE 7

Characteristics of feedstocks No. 1 and No. 2 used for the tests

|  |  | AR AM/VR AL mix Feed No. 1 | AR AM/VR AL mix Feed No. 2 |
|---|---|---|---|
| Density 15/4 |  | 0.9920 | 0.9886 |
| Sulphur | % by weight | 3.90 | 3.86 |
| Nitrogen | ppm | 2995 | 2800 |
| Nickel | ppm | 25 | 22 |
| Vanadium | ppm | 79 | 67 |

TABLE 7-continued

Characteristics of feedstocks No. 1 and No. 2 used for the tests

|  |  | AR AM/VR AL mix Feed No. 1 | AR AM/VR AL mix Feed No. 2 |
|---|---|---|---|
| Conradson carbon | % by weight | 14.4 | 13.2 |
| C7 asphaltenes | % by weight | 6.1 | 4.6 |
| Simulated distillation |  |  |  |
| IP | ° C. | 265 | 261 |
| 5% | ° C. | 366 | 362 |
| 10% | ° C. | 408 | 403 |
| 20% | ° C. | 458 | 454 |
| 30% | ° C. | 502 | 497 |
| 40% | ° C. | 542 | 536 |
| 50% | ° C. | 576 | 571 |
| 60% | ° C. | 609 | 603 |
| 70% | ° C. | — | — |
| 80% | ° C. | — | — |
| 90% | ° C. | — | — |
| DS: EP ° C. | ° C. | 616 | 614 |
| DS: disti res | % by weight | 61 | 63 |

After a stage of sulphurization by circulation of a gas oil cut with added DMDS in the reactor at a final temperature of 350° C., the unit is operated with the petroleum residue described below in the operating conditions of Table 8.

TABLE 8

Operating conditions implemented in the fixed-bed reactor

| Total pressure | 15 MPa |
|---|---|
| Test temperature | 370° C. |
| Hourly space velocity of the residue | 0.8 h$^{-1}$ |
| Flow rate of hydrogen | 1200 std L$_{H2}$/L$_{feedstock}$ |

The AR AM/VR AL mixture of feedstocks is injected, then it is heated to the test temperature. After a period of stabilization of 300 hours, the performances in hydrodesulphurization (HDS) and in hydrodemetallization (HDM) are recorded, as well as in hydroconversion of the VR (540° C.+ cut). Hereinafter, the performances are presented as relative conversions with respect to the reference (set at zero in Tables 9 and 10) or on a relative scale where the activity is normalized at 100 in FIGS. 1 to 4. The 100 therefore does not represent the level zero in the effluent.

Figure 2:
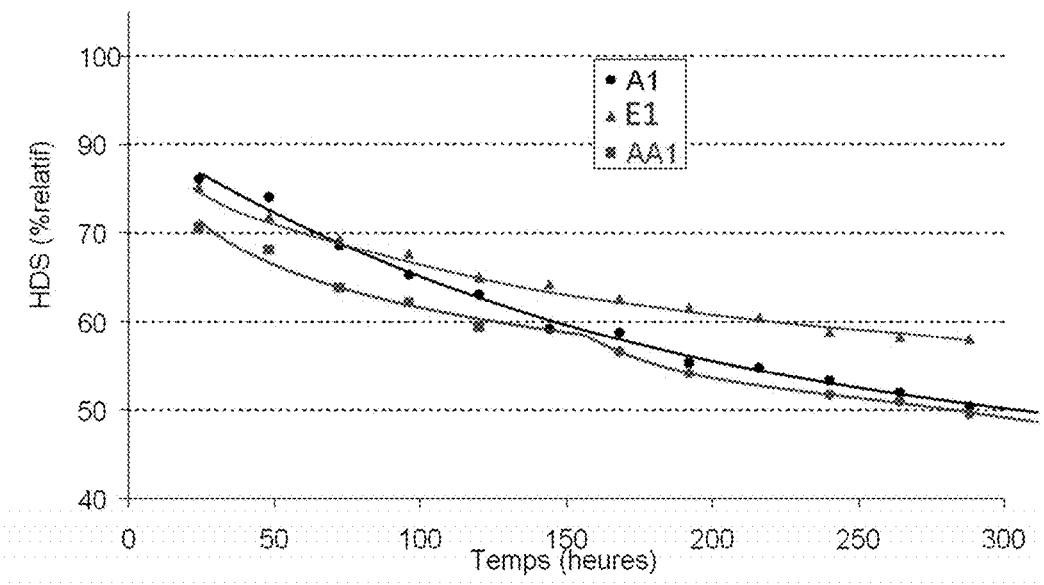
FIG. 2 shows the evolution to 300 hours of the relative hydrodemetallization HDM performances of catalysts A1, AA1, and E1 on a feedstock No. 1 comprising a mixture of atmospheric residue and vacuum residue (ARAM/VRAL).

For the first series of catalysts evaluated with feedstock No. 1, the results in example 4 are confirmed, i.e. increase in hydrodemetallization HDM performances of the catalysts according to the invention relative to the reference catalysts (FIGS. 1 and 2).

TABLE 9

HDS, HDM and HDX performances of catalysts A1, AA1, and E1 on feedstock No. 1

| Catalysts | HDS (%) | HDM (%) |
|---|---|---|
| A1 (according to the invention) | base | base |
| AA1 (according to the invention) | −0.8 | −0.2 |
| E1 | +7.6 | −1.6 |

Figure 3:
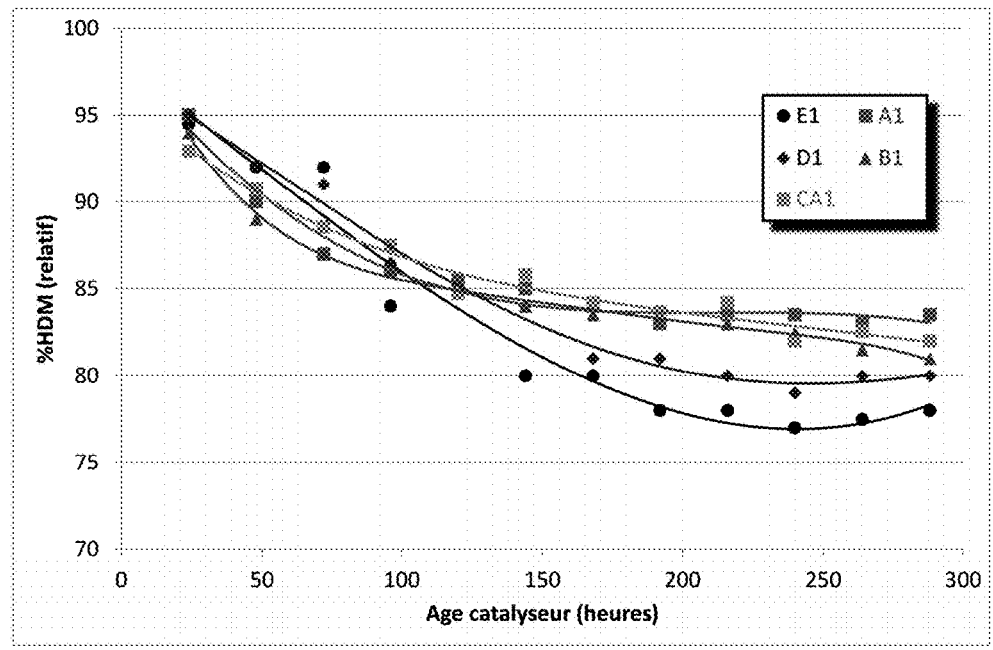
FIG. 3 shows the evolution to 300 hours of the relative hydrodemetallization HDM performances of catalysts A1, CA1, B1, D1 and E1 on a feedstock No. 2 comprising a mixture of atmospheric residue and vacuum residue (ARAM/VRAL).
Figure 4:
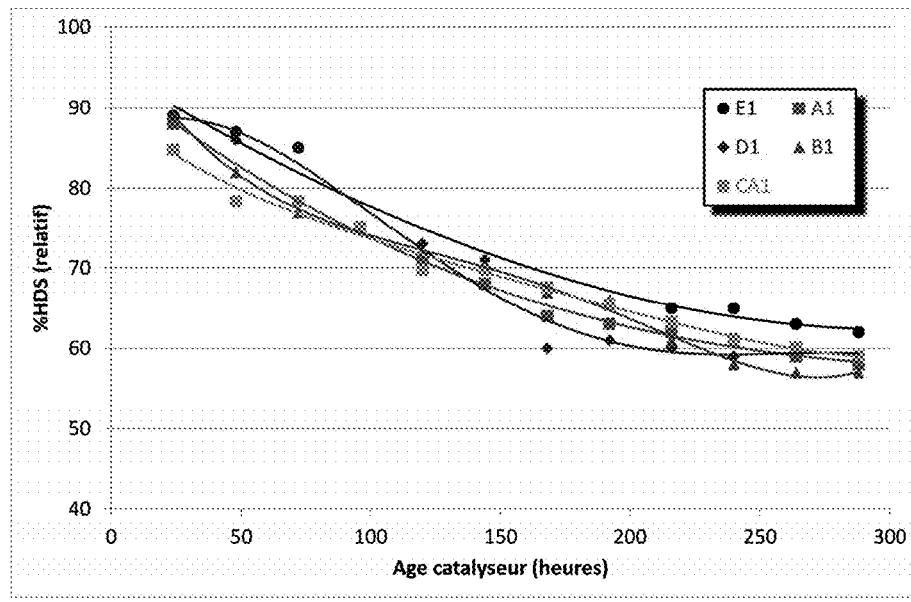
FIG. 4 shows the evolution to 300 hours of the relative hydrodemetallization HDM performances of catalysts A1, CA1, B1, D1 and E1 on a feedstock No. 2 comprising a mixture of atmospheric residue and vacuum residue (ARAM/VRAL).

For the second series (A1, CA1, B1, D1, E1), evaluated on feedstock No. 2, once again the hydrodemetallization HDM performances of the catalysts prepared according to the invention significantly exceeds that of the catalysts of the prior art (FIGS. 3 and 4).

TABLE 10

HDS, HDM and HDX performances of catalysts A1, CA1, B1, D1 and E1 on feedstock No. 2

| Catalysts | HDS (%) | HDM (%) |
|---|---|---|
| A1 (according to the invention) | base | base |
| CA1 | +0.5 | −1.0 |
| B1 | −0.8 | −1.8 |
| D1 | +0.4 | −2.4 |
| E1 | +3.3 | −4.9 |

Example 8

Preparation of a Catalyst According to the Characteristics of U.S. Pat. No. 6,780,817—Catalyst F1 Starting from Support F Support F was prepared by the preparation process in example 3 of patent U.S. Pat. No. 6,780,817.

The pore distribution of the alumina obtained is characterized using a mercury intrusion porosimeter according to standard ASTM D4284-83 at a maximum pressure of 4000 bar (400 MPa), using a surface tension of 484 dyne/cm and a contact angle of 140°. The absence of microporosity is verified by nitrogen porosimetry. These data are summarized in Table 3.

Catalyst F1 was prepared from support F obtained previously. For this purpose, the dry impregnation method was used. The aqueous impregnation solution contains molybdenum and nickel salts as well as phosphoric acid ($H_3PO_4$) and hydrogen peroxide ($H_2O_2$). The molybdenum salt is ammonium heptamolybdate $Mo_7O_{24}(NH_4)_6 \cdot 4H_2O$ and the nickel salt is nickel nitrate $Ni(NO_3)_2 \cdot 6H_2O$. The quantities of each of these salts in solution were determined so as to deposit the desired quantity of each element in the catalyst.

After ripening at ambient temperature in a water-saturated atmosphere, the extrudates of the impregnated support are dried overnight at 120° C. and then calcined at 500° C. for 2 hours under air. The target molybdenum trioxide content is 6% by weight, that of nickel oxide is 1.5% by weight, and that of phosphorus pentoxide is 1.2% by weight. The P/Mo atomic ratio is equal to 0.4 and the Ni/Mo atomic ratio is equal to 0.49. The concentrations of solutions were therefore adjusted to meet this target, taking into account the volume of water uptake of the different supports, the latter being determined conventionally, as well known to a person skilled in the art.

Example 9

Evaluation of the Comparative Catalyst F1

Evaluation of the comparative catalyst F1 under the conditions of example 6, on feedstock No. 1, demonstrates a clear deficit of hydrodemetallization HDM and hydrodesulphurization HDS performances, which emphasizes the importance of combining a large macropore volume with a large mesopore diameter.

TABLE 11

HDS, HDM and HDX performances of catalysts A1, E1, and F1 on feedstock No. 1

| Catalysts | HDS (%) | HDM (%) |
|---|---|---|
| A1 (according to the invention) | base | base |
| F1 | −5.8 | −5.3 |
| E1 | +7.6 | −1.6 |

Example 10

Preparation and Evaluation of Catalysts A2, AA2, and A3, AA3, in Comparison with A1 and AA1 Prepared According to the Invention and E1, E2 and E3 Not According to the Present Invention Catalysts A2, AA2, A3, AA3, and E2, E3 were prepared from supports A and AA, and E in accordance with their nomenclature. For this purpose, the dry impregnation method was used. The aqueous impregnation solution contains molybdenum and nickel salts as well as phosphoric acid ($H_3PO_4$) and hydrogen peroxide ($H_2O_2$). The molybdenum salt is ammonium heptamolybdate $Mo_7O_{24}(NH_4)_6 \cdot 4H_2O$ and the nickel salt is nickel nitrate $Ni(NO_3)_2 \cdot 6H_2O$. The quantities of each of these salts in solution were determined so as to deposit the desired quantity of each element in the catalyst.

After ripening at ambient temperature in a water-saturated atmosphere, the extrudates of the impregnated support are dried overnight at 120° C., and then calcined at 500° C. for 2 hours under air.

For catalysts A2, AA2, E2 the target content of molybdenum trioxide is 8% by weight, that of nickel oxide is 1.5% by weight, and that of phosphorus pentoxide is 2.3% by weight. The P/Mo atomic ratio is equal to 0.58 and the Ni/Mo atomic ratio is equal to 0.37. The concentrations of solutions were therefore adjusted to meet this target, taking into account the volume of water uptake of the different supports, the latter being determined conventionally, as well known to a person skilled in the art.

For catalysts A3, AA3, E3 the target content of molybdenum trioxide is 4.5% by weight, that of nickel oxide is 1.1% by weight, and that of phosphorus pentoxide is 1.5% by weight. The P/Mo atomic ratio is equal to 0.67 and the Ni/Mo atomic ratio is equal to 0.49. The concentrations of solutions were therefore adjusted in order to meet this target, taking into account the volume of water uptake of the different supports, the latter being determined conventionally, as well known to a person skilled in the art.

The different catalysts prepared above were all evaluated according to the test methodology described in example 5.

TABLE 12

HDS, HDM and HDX performances of catalysts A1, AA1, E1, A2, AA2, E2, A3, AA3 and E3

| Catalysts | HDS (%) | HDM (%) |
|---|---|---|
| A1 (according to the invention) | 47.3 | 81.2 |
| AA1 (according to the invention) | 43.8 | 81.1 |
| E1 (comparative) | 51.4 | 76.5 |
| A2 (according to the invention) | 48.9 | 81.6 |
| AA2 (according to the invention) | 46.3 | 81.4 |
| E2 (comparative) | 53.9 | 74.5 |
| A3 (according to the invention) | 45.8 | 82.7 |
| AA3 (according to the invention) | 42.4 | 82.4 |
| E3 (comparative) | 48.2 | 78.7 |

The performances obtained on catalysts A2, AA2, and A3, AA3 show that the combination of the textural properties of supports A and AA with different catalyst formulations as claimed in the present application allows the hydrodemetallization HDM performances to be maximized systematically relative to one and the same formulation deposited on a support with different textural properties, and in particular described in the prior art. The level of hydrodemetallization HDM performances attained is in particular systematically greater than that attainable using the supports and formulations of the prior art.

Moreover, in hydrodesulphurization HDS, the activity deficit is low and of little significance.

Example 11

Evaluation of Stability for a Duration of 3000 Hours (Approximately 4 Months)

The catalyst according to the invention A1 and the comparative catalyst E1 were evaluated in hydrodemetallization for 3000 hours on feedstock No. 2 of Table 5, maintaining a target of 30 ppm of metals (cumulative Ni and V) in the effluent. To do this, the temperature was gradually increased with time in order to compensate for deactivation. The other operating conditions were kept fixed throughout the test, i.e. a total pressure of 150 bar (15 MPa), 0.8 $h^{-1}$ and 1200 std $L_{H2}/L_{feedstock}$.

After 0.5 month, a gain of approximately 2° C. on the activity in hydrodemetallization HDM of catalyst A1 relative to catalyst E1 is confirmed. However, a deficiency in hydrodesulphurization HDS is observed, but is still judged slight, the primary objective of the catalyst according to the invention being to achieve a degree of hydrodemetallization HDM as high as possible at a given temperature with maximum stability over time.

Figure 5:
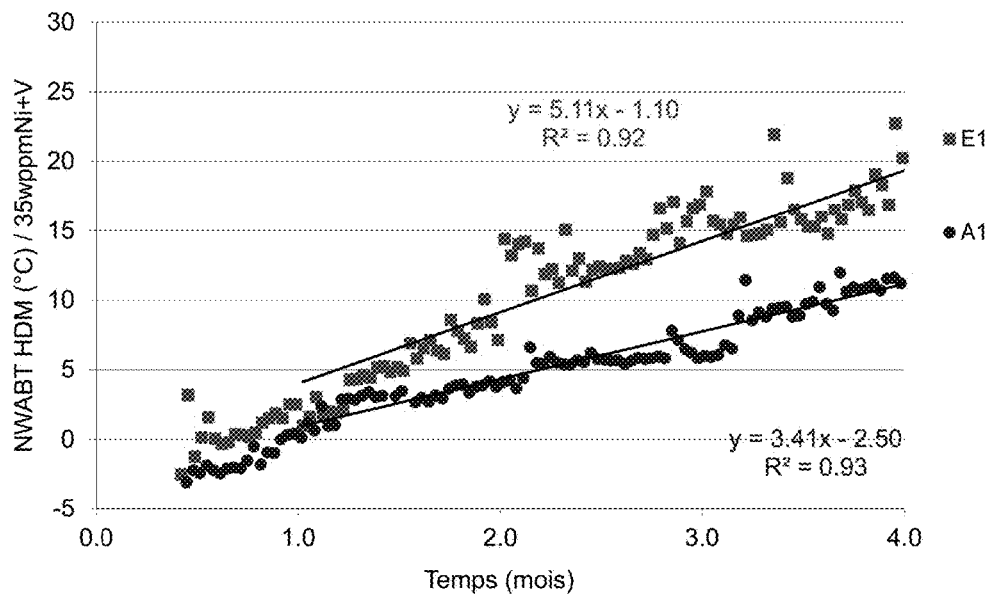
FIG. 5 shows the evolution to 300 hours of the relative hydrodemetallization HDM performances of catalysts A1 and E1 on a feedstock No. 2 comprising a mixture of atmospheric residue and vacuum residue (ARAM/VRAL).

Over the 4 months of tests that were carried out, the deactivation displayed is estimated at 3.4° C./month for catalyst A1 whereas it is 5.1° C./month for the comparative catalyst E1 (FIG. 5). This difference corresponds to a gain in cycle time of 50 rel. %, which is of considerable interest for the refiner.

Figure 6:
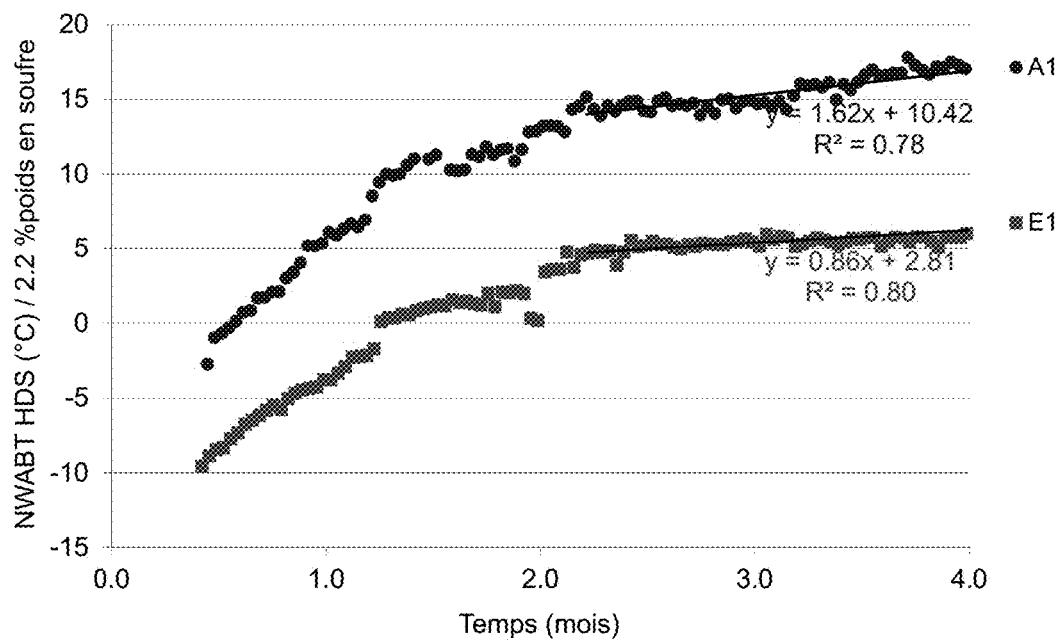
FIG. 6 shows the evolution to 300 hours of the relative hydrodemetallization HDM performances of catalysts A1 and E1 on a feedstock No. 2 comprising a mixture of atmospheric residue and vacuum residue (ARAM/VRAL).

The sulphur content at the unit outlet is greater than that observed with the reference catalyst E1. However, the deactivation is low (1.6° C./month, FIG. 6), which makes it possible to keep to a low operating temperature that is in accordance with the refiner's constraints.

Example 12

Evaluation of the Mechanical Properties of the Solids According to the Invention and Comparison with those of the Solids of the Prior Art The mechanical properties of catalysts A1 and E1 were evaluated by a mechanical strength test (GGC) according to standard ASTM D6175. Their average mechanical strength is 0.9 daN/mm for catalyst A1, which is satisfactory for the applications considered and is greater than what might be observed for other catalysts of the prior art, such as E1, which has a GGC equal to 0.8 daN/mm.

The invention claimed is:
1. Process for the preparation of a hydroconversion catalyst comprising:
   a calcined, predominantly alumina, oxide support; and
   a hydro-dehydrogenating active phase comprising at least one metal of group VIB of the periodic table, optionally at least one metal of group VIII of the periodic table and optionally phosphorus;
said catalyst having:
   a specific surface area Sbet greater than or equal to 100 m²/g,
   a total pore volume measured by mercury porosimetry greater than or equal to 0.75 ml/g,
   a median mesopore diameter by volume greater than or equal to 18 nm,
   a mesopore volume as measured with a mercury intrusion porosimeter greater than or equal to 0.65 ml/g, and
   a macropore volume of between 15 and 40% of the total pore volume;
said process comprising at least the following stages:
   a) a stage of dissolution of an acidic aluminum precursor selected from aluminum sulfate, aluminum chloride and aluminum nitrate in water, at a temperature between 20 and 90° C., at a pH between 0.5 and 5, for a duration between 2 and 60 minutes;
   b) a stage of pH adjustment by adding, to the suspension obtained in stage a), at least one basic precursor selected from sodium aluminate, potassium aluminate, ammonia, sodium hydroxide and potassium hydroxide, at a temperature between 20 and 90° C., and at a pH between 7 and 10, for a duration between 5 and 30 minutes;
   c) a stage of co-precipitation of the suspension obtained at the end of stage b) by adding, to the suspension, at least one basic precursor selected from sodium aluminate, potassium aluminate, ammonia, sodium hydroxide and potassium hydroxide and at least one acidic precursor selected from aluminum sulfate, aluminum chloride, aluminum nitrate, sulfuric acid, hydrochloric acid and nitric acid, at least one of the basic or acidic precursors comprising aluminum, the relative flow rate of the acidic and basic precursors being selected so as to obtain a pH of the reaction medium between 7 and 10 and the flow rate of the acidic and basic precursor or precursors containing aluminum being controlled so as to obtain a final alumina concentration in the suspension between 10 and 38 g/L;
   d) a stage of filtration of the suspension obtained at the end of the co-precipitation stage c) in order to obtain an alumina gel;
   e) a stage of drying said alumina gel obtained in stage d) in order to obtain a powder,
   f) a stage of forming the powder obtained at the end of stage e) in order to obtain a crude material,
   g) a stage of thermal treatment of the crude material obtained at the end of stage f) at a temperature between 500 and 1000° C., in the presence or absence of an air flow containing up to 60% by volume of water, in order to obtain an alumina oxide support; and
   h) a stage of impregnation of the hydro-dehydrogenating active phase on said alumina oxide support.

2. Process according to claim 1, wherein the alumina concentration of the suspension of alumina gel obtained in stage c) is between 13 and 35 g/l.

3. Process according to claim 2, wherein the alumina concentration of the suspension of alumina gel obtained in stage c) is between 15 and 33 g/l.

4. Process according to claim 1, wherein the acidic precursor is aluminum sulfate.

5. Process according to claim 1, wherein the basic precursor is sodium aluminate.

6. Process according to claim 1 in which, in stages a), b), c), the aqueous reaction medium is water and said stages are carried out with stirring, in the absence of organic additive.

7. Process according to claim 1, wherein the acidic precursor of stage a) is introduced in a quantity corresponding to 0.5 to 4% by weight of the total alumina formed at the end of stage c).

8. Mesoporous and macroporous hydroconversion catalyst prepared by the process according to claim 1.

9. Mesoporous and macroporous hydroconversion catalyst according to claim 8 having:
   a specific surface area Sbet greater than 110 m²/g,
   a median mesopore diameter by volume between 18 nm and 26 nm,
   a median macropore diameter by volume between 100 and 1200 nm inclusive,
   a mesopore volume as measured with a mercury intrusion porosimeter greater than or equal to 0.70 ml/g,
   a total pore volume measured by mercury porosimetry greater than or equal to 0.85 ml/g,
   a macropore volume between 17 and 35% of the total pore volume, and
   an absence of micropores.

10. Mesoporous and macroporous hydroconversion catalyst according to claim 9, having a macropore volume between 20 and 30% of the total pore volume.

11. Mesoporous and macroporous hydroconversion catalyst according to claim 8, having a median mesopore diameter by volume determined with a mercury intrusion porosimeter between 19 and 25 nm and a median macropore diameter by volume between 110 and 1000 nm inclusive.

12. Hydroconversion catalyst according to claim 8, in which the group VIB metal content is between 2 and 10% by weight of trioxide of group VIB metal relative to the total weight of the catalyst, the group VIII metal content is between 0.0 and 3.6% by weight of the oxide of group VIII metal relative to the total weight of the catalyst, the content of the element phosphorus is between 0 and 5% by weight of phosphorus pentoxide relative to the total weight of the catalyst.

13. Hydroconversion catalyst according to claim 8, in which the hydro-dehydrogenating active phase is composed of molybdenum or of nickel and molybdenum or of cobalt and molybdenum.

14. Hydroconversion catalyst according to claim 13, in which the hydro-dehydrogenating active phase also comprises phosphorus.

15. Process for hydrotreating a heavy hydrocarbon feedstock selected from atmospheric residues, vacuum residues obtained from direct distillation, deasphalted oils, residues originating from conversion processes, used alone or in a mixture, comprising bringing said feedstock into contact with hydrogen and a hydroconversion catalyst according to claim 8.

16. Hydrotreating process according to claim 15, carried out partly in an ebullating bed at a temperature between 320 and 450° C., under a hydrogen partial pressure comprised between 3 MPa and 30 MPa, at a space velocity between 0.1 and 10 volumes of feedstock per volume of catalyst per hour, and with a ratio of gaseous hydrogen to liquid hydrocarbon feedstock between 100 and 3000 normal cubic meters per cubic meter.

17. Hydrotreating process according to claim 15, carried out at least partly in a fixed bed at a temperature between 320° C. and 450° C., under a hydrogen partial pressure between 3 MPa and 30 MPa, at a space velocity between 0.05 and 5 volumes of feedstock per volume of catalyst per hour, and with a ratio of gaseous hydrogen to liquid hydrocarbon feedstock between 200 and 5000 normal cubic meters per cubic meter.

18. Process for hydrotreating a heavy hydrocarbon feedstock according to claim 17 in a fixed bed comprising at least:
   a) a stage of hydrodemetallization; and
   b) a stage of hydrodesulfurization;
   in which said hydroconversion catalyst is used in at least one of said stages a) and b).

19. Process for hydrotreating a heavy hydrocarbon feedstock according to claim 18, in a fixed bed, wherein said hydroconversion catalyst is used in a first catalyst bed of the hydrodemetallization stage a).

20. Process for hydrotreating heavy hydrocarbon feedstock in an ebullating bed according to claim 16, wherein the feedstock has a cumulative metals content greater than or equal to 50 ppm and said hydroconversion catalyst is used for the reactions of hydrodemetallization.

21. Process according to claim 15, wherein the heavy hydrocarbon feedstock is selected from residues originating from coking, fixed-bed, ebullating-bed or moving-bed hydroconversion processes, used alone or in a mixture.

* * * * *